US010771534B2

(12) United States Patent
Gadalin et al.

(10) Patent No.: US 10,771,534 B2
(45) Date of Patent: *Sep. 8, 2020

(54) POST DATA SYNCHRONIZATION FOR DOMAIN MIGRATION

(71) Applicant: Amazon Technologies, Inc., Seattle, WA (US)

(72) Inventors: Alexey Gadalin, Kirkland, WA (US); Nikolay Krasilnikov, Seattle, WA (US); Rudresh Amin, Seattle, WA (US); Weili Zhong McClenahan, Seattle, WA (US); Anton Valter, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/297,065

(22) Filed: Mar. 8, 2019

(65) Prior Publication Data
US 2019/0208005 A1    Jul. 4, 2019

Related U.S. Application Data

(63) Continuation of application No. 14/981,680, filed on Dec. 28, 2015, now Pat. No. 10,230,785.

(51) Int. Cl.
*H04L 29/08* (2006.01)
*G06F 9/455* (2018.01)

(52) U.S. Cl.
CPC .......... *H04L 67/10* (2013.01); *G06F 9/45558* (2013.01); *H04L 67/1095* (2013.01);
(Continued)

(58) Field of Classification Search
CPC ..................... G06F 3/0647; H04L 67/1097
(Continued)

(56) References Cited

U.S. PATENT DOCUMENTS 7,313,793 B2   12/2007   Traut et al.
7,484,208 B1    1/2009   Nelson
(Continued)

OTHER PUBLICATIONS

"Primary and Synctarget", Retrieved from URL: http://www.gossamer-threads.com/list/drbd/users/8380, Nov. 13, 2015, pp. 1-4.

*Primary Examiner* — Tauqir Hussain
(74) *Attorney, Agent, or Firm* — Robert C. Kowert; Kowert, Hood, Munyon, Rankin & Goetzel, P.C.

(57) ABSTRACT

Methods and apparatus for post data synchronization in live migration of domains. Host devices on a network may implement virtual machines (VMs) as domains in an execution environment, and may provide local persistent storage for data of the VMs. A migration technique for moving a domain including the persistent data from one host device to another host device is described in which the VM is instantiated on the target device, and the domain is switched to the target device. Synchronization of the VM's data from the persistent storage on the source device to the target device is then initiated, for example according to a distributed replicated storage technique that makes the target device's persistent storage the primary storage and the source device's persistent storage the secondary storage for the VM. Once the data is synchronized, the VM and its respective storage on the source device are released.

20 Claims, 14 Drawing Sheets

(52) U.S. Cl.
CPC .......... *H04L 67/1097* (2013.01); *H04L 67/32* (2013.01); *G06F 2009/4557* (2013.01); *G06F 2009/45579* (2013.01); *G06F 2009/45595* (2013.01)

(58) Field of Classification Search
USPC ........................................................ 709/217
See application file for complete search history.

(56) References Cited

U.S. PATENT DOCUMENTS

| | | | |
|---|---|---|---|
| 8,671,238 B2 | 3/2014 | Mashtizadeh et al. | |
| 8,751,878 B1* | 6/2014 | Don | G06F 11/07 714/55 |
| 8,819,374 B1* | 8/2014 | Don | G06F 3/0647 711/112 |
| 2005/0083862 A1* | 4/2005 | Kongalath | H04W 8/30 370/299 |
| 2010/0169537 A1* | 7/2010 | Nelson | G06F 9/45558 711/6 |
| 2011/0113259 A1* | 5/2011 | Bilodi | G06F 21/606 713/193 |
| 2011/0197039 A1* | 8/2011 | Green | G06F 3/0617 711/162 |
| 2011/0320556 A1 | 12/2011 | Reuther | |
| 2012/0066677 A1* | 3/2012 | Tang | G06F 9/4856 718/1 |
| 2012/0278572 A1* | 11/2012 | Broido | G06F 3/0607 711/162 |
| 2014/0181804 A1* | 6/2014 | Sakata | G06F 9/455 718/1 |
| 2016/0203219 A1* | 7/2016 | Hoch | G06F 16/951 707/827 |

* cited by examiner

POST DATA SYNCHRONIZATION FOR DOMAIN MIGRATION

This application is a continuation of U.S. patent application Ser. No. 14/981,680, filed Dec. 28, 2015, which is hereby incorporated by reference herein in its entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers or clients. Some public data center operators provide network access, power, and secure installation facilities for hardware owned by various clients, while other public data center operators provide "full service" facilities that also include hardware resources made available for use by their clients. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many clients with diverse needs, allowing various computing resources to be efficiently and securely shared by multiple clients. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

Figure 1:
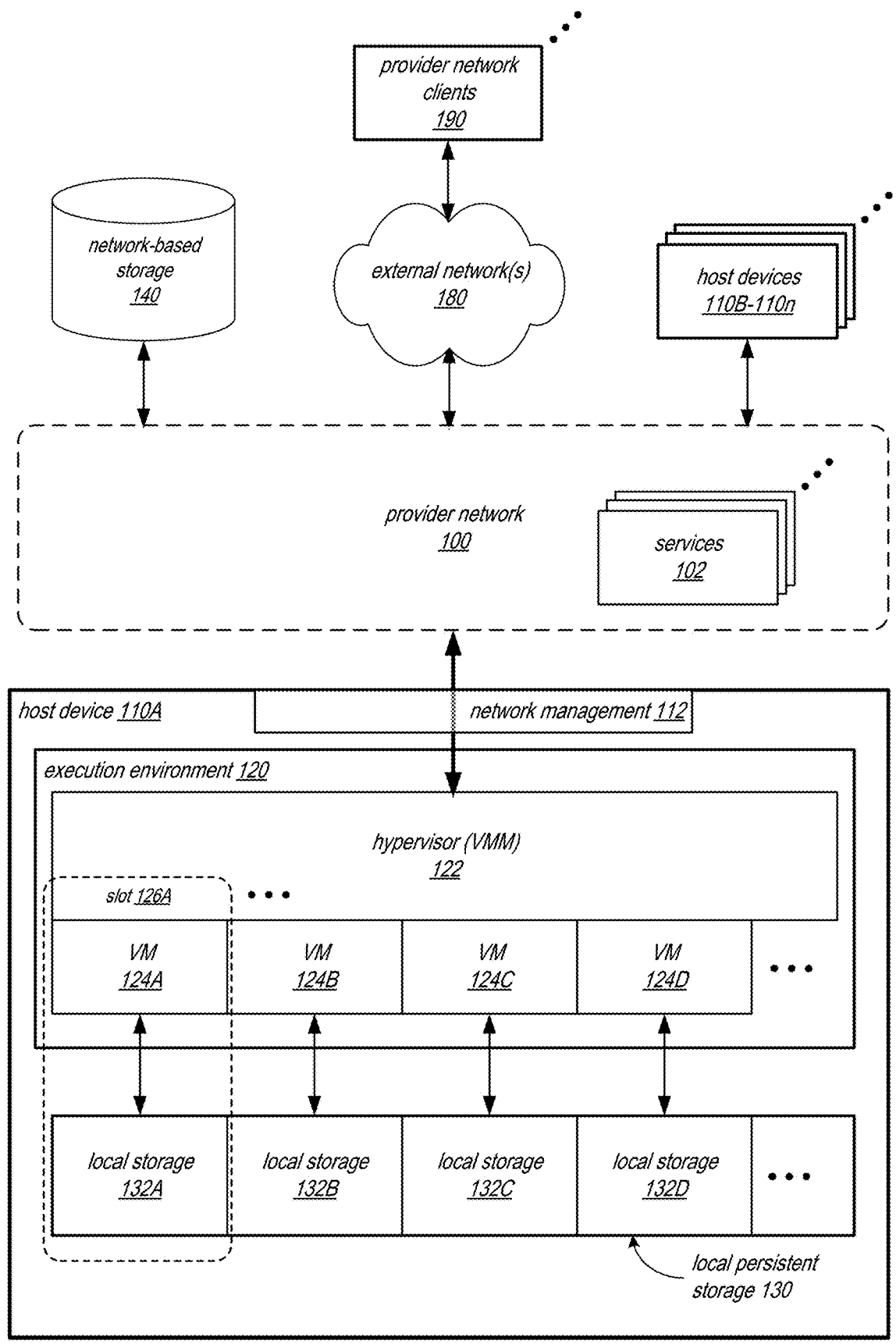
FIG. 1 illustrates a provider network environment in which embodiments of the methods and apparatus for post data synchronization in migration of domains may be implemented, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for post data synchronization in migration of domains in network environments are described. Host devices on a network may implement virtual machines (VMs) as domains in an execution environment, and may also provide local persistent storage for data of the VMs. Embodiments of a domain migration method are described in which the switch or "flip" of a domain from a source host device to a target host device is performed prior to the transfer of the domain's persistent data from the local persistent store of the source host device to the local persistent store of the target host device. Embodiments may allow domain migration to be performed without taking the domain down for an extended period during which the data is transferred to the target host device and during which two slots on the host devices in the network are occupied, and without requiring advanced planning and scheduling of a time period for a pre-migration data transfer during which two slots on the host devices in the network are occupied. The actual domain switch from the source host device to the target host device may be performed in seconds or less than a second, and the persistent data store for the domain remains available and accessible during the post-switch data synchronization process. Thus, the domain and its persistent data store remains available and accessible in the network environment during the domain migration process with little or no noticeable effects at the domain switch. The slot on the source host device may be released as soon as the data synchronization is completed. Using this domain migration method, the time period during which the two host system slots are occupied may be reduced, in some cases from days or weeks to hours or minutes. Embodiments of the domain migration method may be employed to transfer domains between host devices in a variety of network environments, including production network environments, and may be used to transfer domains for a variety of purposes and in a variety of migration scenarios.

Host devices on a network may implement virtual machines (VMs) as domains in an execution environment, and may also provide local persistent storage for data of the VMs, with each VM/domain instantiated on a host device allocated a portion of the local persistent storage. A hypervisor, or virtual machine monitor (VMM) on a host device may manage the VMs/domains on the device. Network services and hypervisors may provide functionality that allows the transferal of domains on one host device (referred to as a source host device) to another host device (referred to as a target host device) on the network. A transferal of a domain from one host device to another host device on the network may be referred to as a migration. One method for performing the migration process involves stopping the domain on the source host device, instantiating the VM on the target host device, gathering and transferring the domain state to the target host device, transferring the domain data from the local persistent store of the source host device to the local persistent store of the target host device, and starting the domain on the target host device after completion of the transfer of the domain state and persisted data to the target host device. A disadvantage of this method for performing the domain migration process is that the domain is stopped and thus unavailable until completion of the transfer of the domain state and the persisted data. If there is a significant amount of persisted data on the source host device, this migration process may take hours or days, which is not generally acceptable in a production environment. Further, two host device slots are occupied in the production network until the migration is complete.

A partial solution for the downtime problem with the above method for performing the migration process is to copy the domain data from the local persistent store of the source host device to the local persistent store of the target host device prior to stopping the domain on the source host device (referred to as a pre-migration data transfer). However, this approach requires preparing the target host device in advance; a slot on the target host device for the VM and persistent data must be allocated for the migration well in advance of the actual domain migration. In addition, the domain stop/state transfer/start process has to be scheduled in advance, with sufficient lead time to complete the data transfer. It is difficult to precisely estimate data transfer time between host devices in a production network environment. Thus, extra time has to be added to the lead time as a buffer; otherwise, problems may result from an unfinished data transfer at the scheduled time for the domain stop/start. This may result in a scheduled window of days or weeks from the time the target slot is allocated for the migration until the migration is complete and the source slot can be released. Further, two host device slots are occupied in the production network from the time the slot on the target host device is allocated for the pre-migration data transfer until the migration is complete.

Embodiments of methods and apparatus for post data synchronization in migration of domains in network environments are described that provide solutions to the shortcomings of the above domain migration methods. In embodiments, a domain migration method is provided in which the switch or "flip" of the domain from the source host device to the target host device is performed prior to the transfer of the domain's persistent data from the local persistent store of the source host device to the local persistent store of the target host device. In some embodiments, the migration method involves instantiating a copy of the VM of the domain on the target host device and synchronizing the domain state or context from the execution environment of the source host device to the execution environment of the target host device (the domain may remain active on the source host device during this process) and, once the domain state is synchronized, stopping the domain on the source host device and starting the domain on the target host device (the "switch"). The actual domain stop/start (the switch) may be performed in a second or less (e.g., ~100 milliseconds).

After switching the domain from the source host device to the target host device, a data synchronization process may begin transferring the persistent data for the domain from the local persistent store of the source host device to the local persistent store of the target host device. The persistent data store for the domain remains available and accessible during the data synchronization process; reads from and writes to the domain's persistent data may be received and processed at the domain on the target host device. In some embodiments, the data synchronization process may include launching a background synchronization process that copies data (e.g., blocks of data in a block-based system) from the source host device to the target host device over a network while the domain remains available and active; reads from and writes to the domain's persistent data may be performed while this background process is copying the data.

In some embodiments, data read requests for the domain during the data synchronization process may be handled by first attempting to fulfill the requests from the persistent data storage on the target host device and, if the requested data is not available on the target host device, fetching the requested data from the persistent data storage on the source host device. The fetched data may be used to fulfill the read requests, and may also be stored to the persistent data storage on the target host device. In some embodiments, data writes for the domain during the data synchronization process may be stored to the persistent data storage on the target host device, and also may be copied over the network to be stored to the persistent data storage on the source host device.

Copying the data writes to the source host device may, for example, maintain consistency between the data sets on the two host devices, and maintain the persistent data for the domain on the source host device in an updated and useable state if something should go wrong on the target host device during the data synchronization process. For example, in some embodiments, if the target host device fails during the data synchronization process, another host device may be selected as a new target host device, the domain may be switched to the new target host device, and the data synchronization process may be restarted to transfer the persistent data on the original source host device, which was kept up to date by the data synchronization process, to the new target host device.

Embodiments may thus allow domain migration to be performed without the downtime problem of the first method, and without requiring advanced planning and scheduling of a time period for pre-migration data transfer during which two slots on host devices in the network are occupied as is required by the second method. In embodiments, the actual domain switch from one host device to another may be performed in seconds or less than a second, and the persistent data store for the domain remains available and accessible during the migration and data synchronization process; thus, the domain and its persistent data store remains available and accessible in the production environment with little or no noticeable delay at the domain switch. Thus, using embodiments of this domain migration method, a domain may be transferred from one host device to another host device at any time without requiring advanced planning or scheduling, and may be performed seamlessly without significantly affecting clients or owners of the domains. Further, the slot on the source host device may be released as soon as the data synchronization is completed, and the time period during which the two host system slots are occupied may be reduced, in some cases from days or weeks to hours or minutes.

Embodiments of the methods and apparatus for post data synchronization in migration of domains in network environments may be employed to transfer domains between host devices in a variety of network environments, including production network environments, and may be used to transfer domains for a variety of purposes and in a variety of migration scenarios. For example, embodiments may be employed by the network provider to perform seamless live migrations of domains from one host device to another host device, for example if the source host device needs to be taken offline for service or for other purposes such as load distribution across host devices; since the migrations can be performed without a scheduled lead time for data transfer and without downtime for the domains, the migrations may be essentially invisible to the domains' owners and clients. As another example, embodiments may be adapted for use in performing reboot migrations of domains from one host device to another host device upon request by the domain owners. Since there is no requirement to schedule a migration in advance, and no lead time to perform the data transfer in advance of the reboot needs to be scheduled, the domain owners may request a reboot to be performed at any time they wish.

In some embodiments, a migration system, service, or module may be implemented by one or more devices on the network to manage the domain migration and data synchronization methods as described herein. This migration system, service, or module may be referred to as a migration orchestrator. In some embodiments, the migration orchestrator may perform or direct the migration by determining that a VM on a source host device is to be migrated to a target host device, instantiating or directing the instantiation of an instance of the VM on the target host device, switching or directing the switching of the domain corresponding to the VM from the source host device to the target host device, initiating and monitoring the data synchronization process that performs synchronization of data for the VM stored in the local persistent storage of the source host device to the local persistent storage of the target host device, and, upon determining that the synchronization of the data is complete, releasing the VM and its allocated portion of the local persistent storage (referred to as a "slot") on the source host device. In some embodiments, instantiating the instance of the VM on the target host device may involve installing a machine image of the VM in the execution environment of the target host device and synchronizing the state or context of the VM in the execution environment of the source host device to the VM in the execution environment of the target host device. In some embodiments, switching the domain from the source host device to the target host device is performed upon completion of the synchronization of the state or context to the target host device. In some embodiments, switching the domain from the source host device to the target host device involves remapping one or more network virtual addresses from the VM on the source host device to the VM on the target host device and, if there is network-addressable storage attached to the VM on the source host device, re-attaching the network-addressable storage to the VM on the target host device. Note that, in at least some embodiments, remapping the addresses and re-attaching the network-attachable storage may be performed programmatically and/or manually via the network using commands or instructions to change tables and other data on or otherwise reconfigure network devices or processes, storage systems, host systems, VMMs, VMs, and the like, and thus may not involve physically detaching and re-attaching of cables, flipping of switches, or the like.

In some embodiments, distributed replicated storage technology, for example implemented by distributed replicated storage modules on the respective host devices, may be leveraged to perform the data synchronization process. The distributed replicated storage technology may, for example, be leveraged to implement a background data synchronization process that copies data (e.g., blocks of data in a block-based system) from the source host device to the target host device over a network while the domain remains available and active. The distributed replicated storage technology may also be leveraged to enable the reads from and writes to the domain's persistent data that are performed during the data synchronization process as described above in which reads are fulfilled from the persistent data store of target host device or the persistent data store of source host device, depending on the location of the data during the data synchronization process, and in which data is written to both the persistent data store of target host device and the persistent data store of source host device during the data synchronization process. In some embodiments, for example, the distributed replicated storage technology may be leveraged to make the local persistent storage of the target host device a primary storage node for the domain on the target host device according to the distributed replicated storage technique, and make the local persistent storage of the source host device a secondary storage node for the domain on the target host device according to the distributed replicated storage technique.

An example distributed replicated storage technology that may be leveraged to perform the data synchronization process in some embodiments is Distributed Replicated Block Device (DRBD®) technology. DRBD® is a trademark or registered trademark of LINBIT® in Austria, the United States and other countries. However, any suitable proprietary or third-party distributed replicated storage technology may be used in embodiments.

Embodiments of the methods and apparatus for post data synchronization in migration of domains in network environments may, for example, be implemented in the context of a service provider that provides to clients or customers, via an intermediate network such as the Internet, virtualized resources (e.g., virtualized computing and storage resources) implemented on a provider network of the service provider, typically in a data center of the service provider. FIG. 1 illustrate an example provider network environment in which embodiments of the methods and apparatus for post data synchronization in migration of domains in provider network environments may be implemented. FIGS. 7 through 11 and the section titled Example provider network environments further illustrate and describe example service provider network environments in which embodiments of the methods and apparatus as described herein may be implemented.

Figure 11:
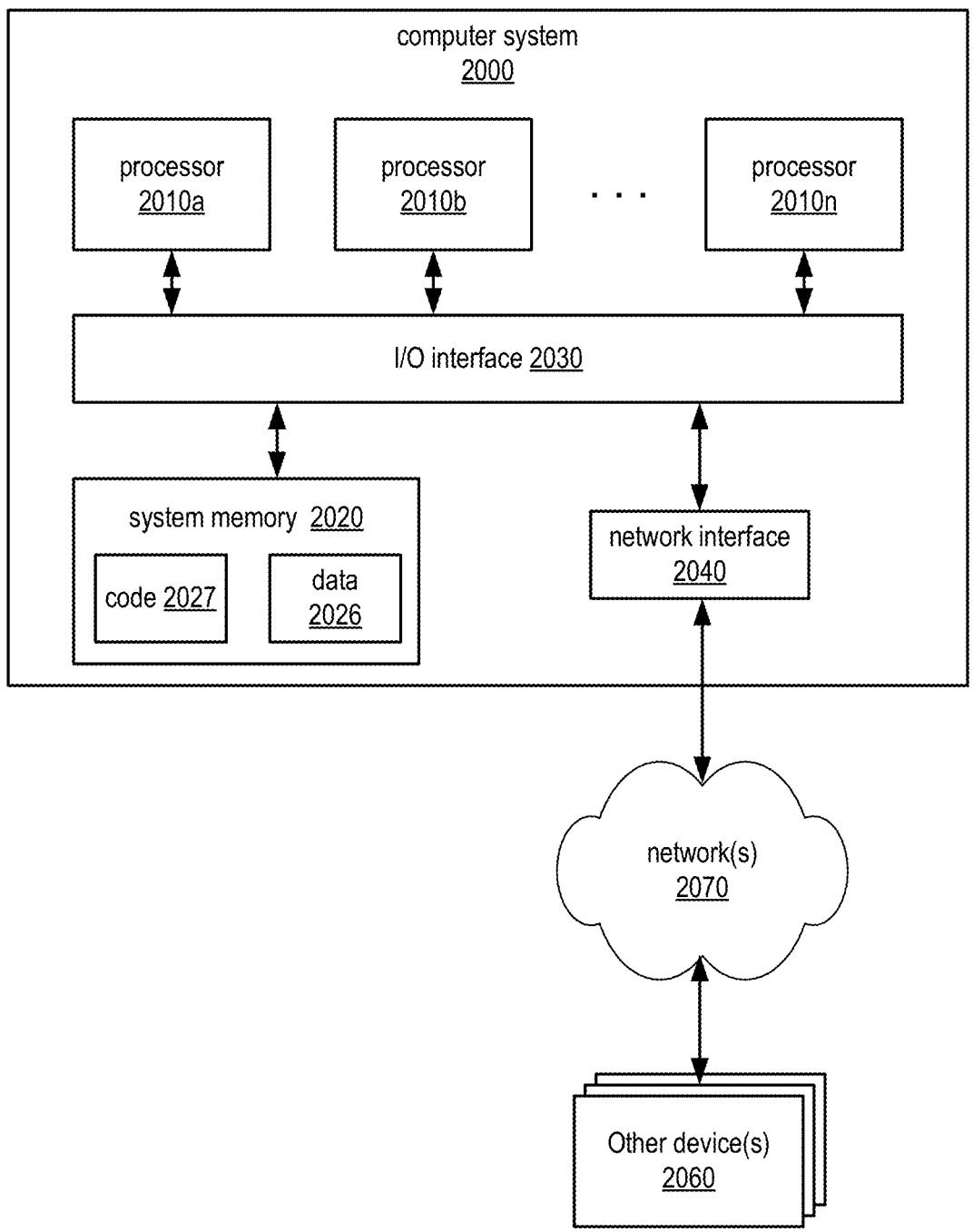
FIG. 11 is a block diagram illustrating an example computer system that may be used in some embodiments.

FIG. 1 illustrates a provider network environment in which embodiments of the methods and apparatus for post data synchronization in migration of domains may be implemented, according to some embodiments. As shown in FIG. 1, provider network clients 190 may access one or more services 102 of the provider network 100 to configure and manage resource instances as virtual machines (VMs) 124 on host device(s) 110 on the provider network 100. The VMs 124 may be assigned network virtual addresses within an address space; the network virtual addresses may be portable addresses that can be mapped or remapped to other endpoints (e.g., other VMs) on the provider network 100. Packets sent from the VMs 124 may be encapsulated by a network management 112 component of the host device 110 and routed to their destinations via the provider network 100. Packets sent to the VMs 124 may be decapsulated by the network management 112 component of the host device 110 and provided to respective VMs 124. FIG. 11 shows an example system that may be used as a host device 110 in some embodiments. In some embodiments, host devices 110 may be or may include rack-mounted devices (e.g., rack-mounted server devices), with multiple racks in a data center that implements the provider network 100 each including one or more of the host devices 110 and possibly other rack- and network-related hardware.

In some embodiments, VMs 124 on a host device 110 may include virtualized computing resources of a client 190 implemented on multi-tenant hardware that is shared with other clients 190. In these embodiments, the clients' traffic may be handled and routed to and from the clients' respective VMs 124 on the host device 110 by the network management 112 component of the host device 110.

The host devices 110 on the provider network 100 may implement VMs 124 as domains in an execution environment 120. At least some of the host devices 110 may also provide local persistent storage 130 for data of the VMs 124, with each VM/domain instantiated on a host device 110 (e.g., host device 110A) allocated a portion 132 of the local persistent storage 130, for example 1 gigabyte (gB), 5 gB, etc. A hypervisor 122, or virtual machine monitor (VMM) on a host device 110 (e.g., host device 110A) may manage the VMs/domains on the respective device. Each VM/domain and its local storage 132 allocation occupies a slot 126 on the respective host device 110 (e.g., as shown by slot 126A on host device 110A). A host device 110 may have a fixed number of slots 126 (e.g., 8, 10, or more), with slots 126 that are currently allocated to or reserved for a domain being referred to as occupied or unavailable slots, and slots 126 that are not allocated to or reserved for a domain being referred to as unoccupied, free, or available slots. Note that, during a migration process for a domain from one host device 110 to another host device 110, two slots may be reserved for or allocated to the domain.

In at least some embodiments, at least some of the VMs 124 on a host device 110 may be attached to one or more shared network-based storage 140 systems or devices, for example via storage services offered by the provider network 100. Note that the network-based storage 140 is separate from the local persistent storage 130 provided by the respective host device 110, and that a VM/domain is not necessarily attached to network-based storage 140.

One or more of the services 102 or other processes of the provider network 100 and the hypervisors 110 may provide functionality that allows the transferal of domains on one host device 110 (referred to as a source host device) to another host device 110 (referred to as a target host device) on the network 100. A transferal of a domain from one host device 110 to another host device 110 on the network 100 may be referred to as a domain migration, or simply migration. Embodiments of a domain migration method are described in which the switch or "flip" of the domain from the source host device to the target host device is performed prior to the transfer of the domain's persistent data from the local persistent store 130 of the source host device 110 to the local persistent store 130 of the target host device 110.

FIGS. 2A through 2D graphically illustrate the migration of a domain from a source host device to a target host device using a domain migration method that employs a post-switch data synchronization process, according to some embodiments. The methods and apparatus illustrated in FIGS. 2A through 2D may, for example, be implemented in a network environment as illustrated in FIG. 1 to migrate domains between host devices on the provider network.

Figure 2A:
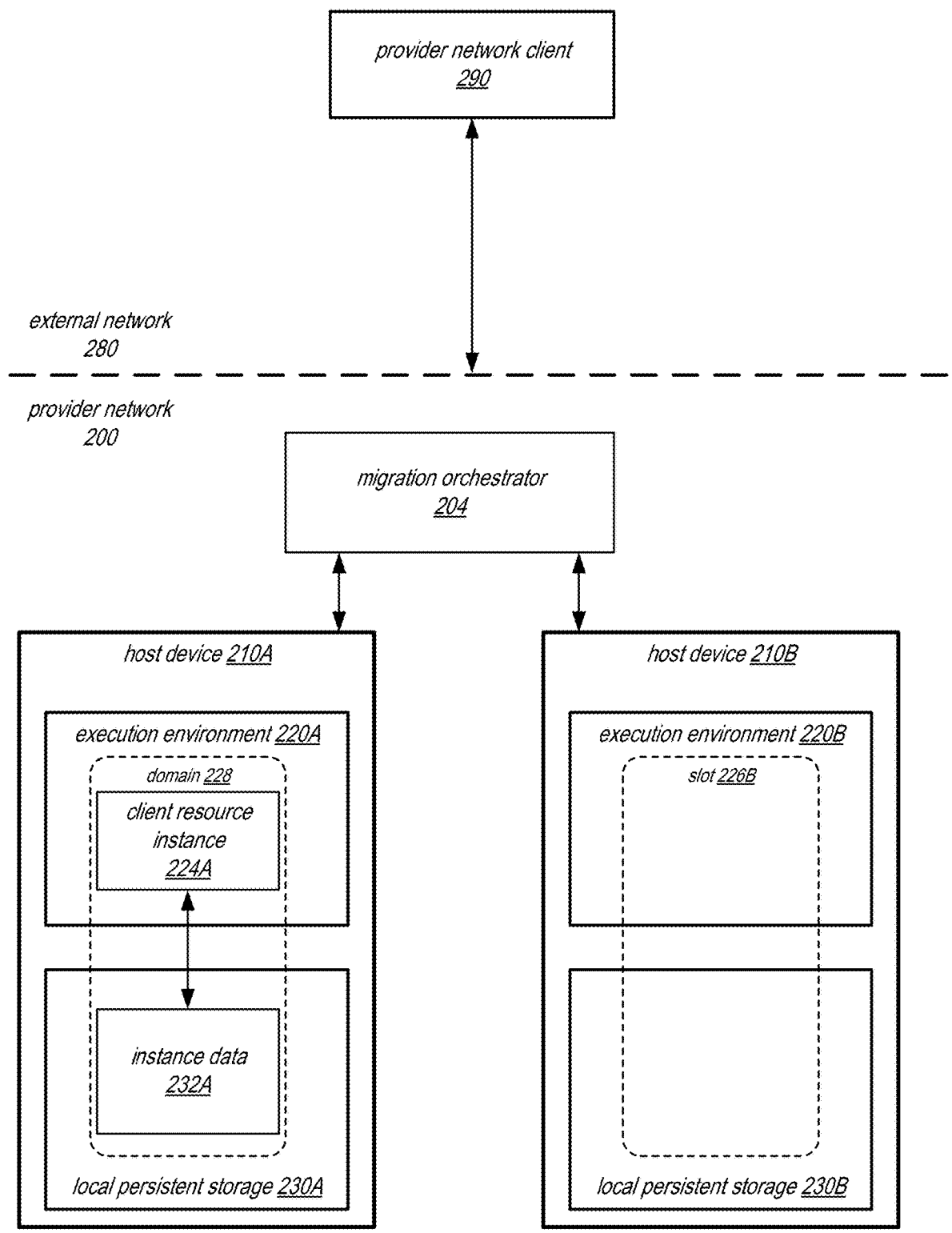
FIGS. 2A through 2D graphically illustrate the migration of a domain from a source host device to a target host device, according to some embodiments.

FIG. 2A shows a provider network 200 that includes a host device 210A and a host device 210B, and an external network 280 that includes a provider network client 290. Host device 210A implements a client resource instance 224A (a VM) as a domain 228 in its execution environment 220A, and stores instance data 232A for the instance 224A in local persistent storage 230A. Host device 210B may include at least one free slot 226B.

In some embodiments, a migration system, service, or module, referred to as a migration orchestrator 204, may be implemented by one or more devices on the provider network 200 to manage domain migration. In some embodiments, the migration orchestrator 204 may determine that domain 228 is to be migrated from host device 210A to anther host device 210 on the provider network 200. For example, a process or service on the provider network 200 may communicate to the migration orchestrator 204 that one or more domains 228 on host device 210A are to be moved from the host device 210A to a different host device 210 so that the host device 210A (or rack including the host device 210A) can be taken offline or out of service for maintenance or other reasons, or for other reasons such as load distribution across host devices on the provider network 200. As another example, the owner of the domain 228 (e.g., the provider network client 290) may request that the domain 228 be moved to another host device 210 on the provider network. In some cases, the request for migration of the domain 228 may specify that the domain 228 is to be migrated to a host device 210 in a different rack on the provider network 200.

The migration orchestrator 204 may determine that host device 210B is the target host device for the migration. In some embodiments, a particular host device (e.g., host device 210B) may be specified as the target host device for the migration by the entity that is requesting the migration. Alternatively, the migration orchestrator 204 may determine or select host device 210B as the target host device for the migration, for example by polling host devices 210 on the provider network 200 to find a host device 210B with a free slot 226, or by locating a host device 210 with a free slot 226 in a list of host devices 210 that indicates current status of the slots 226 on the host devices 210. If the host devices 210 are rack-mounted devices, the target host device 210B may be in the same rack as host device 210A, or may be in a different rack. After host device 210B is determined as the target host device for the migration, a slot 226B on the host device 210B is reserved or allocated for the domain migration.

Figure 2B:
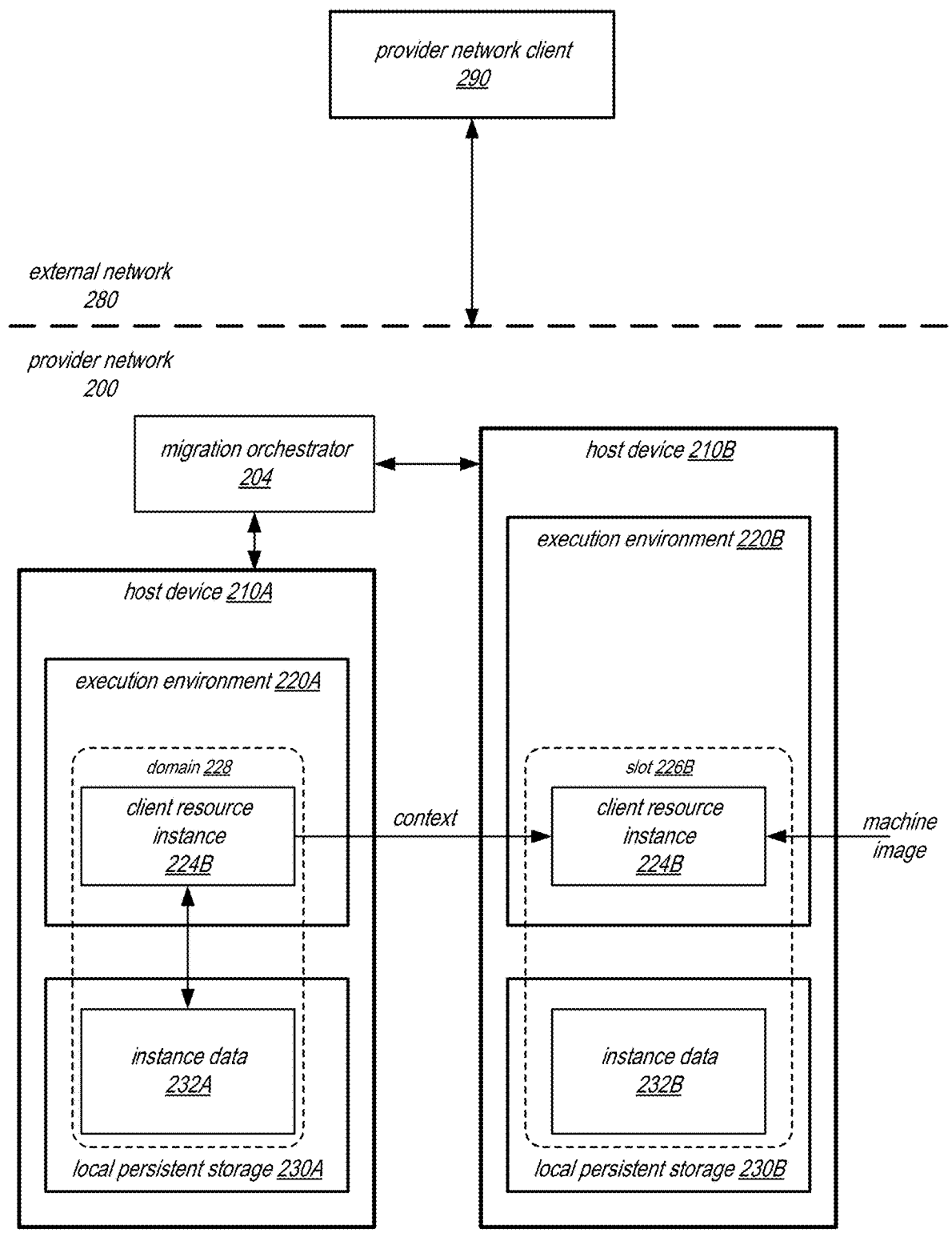

FIG. 2B graphically illustrates the migration orchestrator 204 instantiating or directing the instantiation of an instance 224B of the client resource as a VM in the slot 226B on the target host device 210B. In some embodiments, instantiating the instance of the VM on the target host device may involve installing a machine image of the VM as a client resource instance 224B in the execution environment 220B of the target host device 210B and synchronizing the state or context of the client resource instance 224A in the execution environment 220A of the source host device 210A to the newly-instantiated client resource instance 224B in the execution environment 220B of the target host device 210B. The machine image may, for example, be obtained from the provider network client 290, may be retrieved from network-based storage on the provider network 200, or may be obtained from other sources. Synchronizing the state or context may, for example, involve copying content of volatile, non-persisted memory allocated to or used by the client resource instance 224A in the execution environment 220A of the source host device 210A over the network 200 to the execution environment 220B of the target host device 210B. However, the synchronization shown in FIG. 2B does not involve copying the persisted instance data 232A for the domain 228 from source host device 210A to target host device 210B. Synchronizing client resource instance 224A and client resource instance 224B results in client resource instance 224B having the same execution state and context in execution environment 220B as the client resource instance 224A has in execution environment 220A.

Once the execution state and context of the two client resource instances 224A and 224B are synchronized, the migration orchestrator 204 may direct the domain switch from host device 210A to 210B. In some embodiments, the domain switch may be performed in a second or less, e.g. ~100 milliseconds. In some embodiments, switching the domain 228 from the source host device 210A to the target host device 210B involves remapping one or more network virtual addresses from the VM (client resource instance 224A) on the source host device 210A to the VM (client resource instance 224B) on the target host device 210B and, if there is network-addressable storage attached to the VM on the source host device 210A, re-attaching the network-addressable storage to the VM on the target host device 210B. In at least some embodiments, remapping the addresses and re-attaching the network-attachable storage may be performed programmatically on network 200 using commands or instructions to change tables and other data on or otherwise reconfigure network devices or processes, storage systems, host systems, VMMs, VMs, and the like.

Figure 2C:
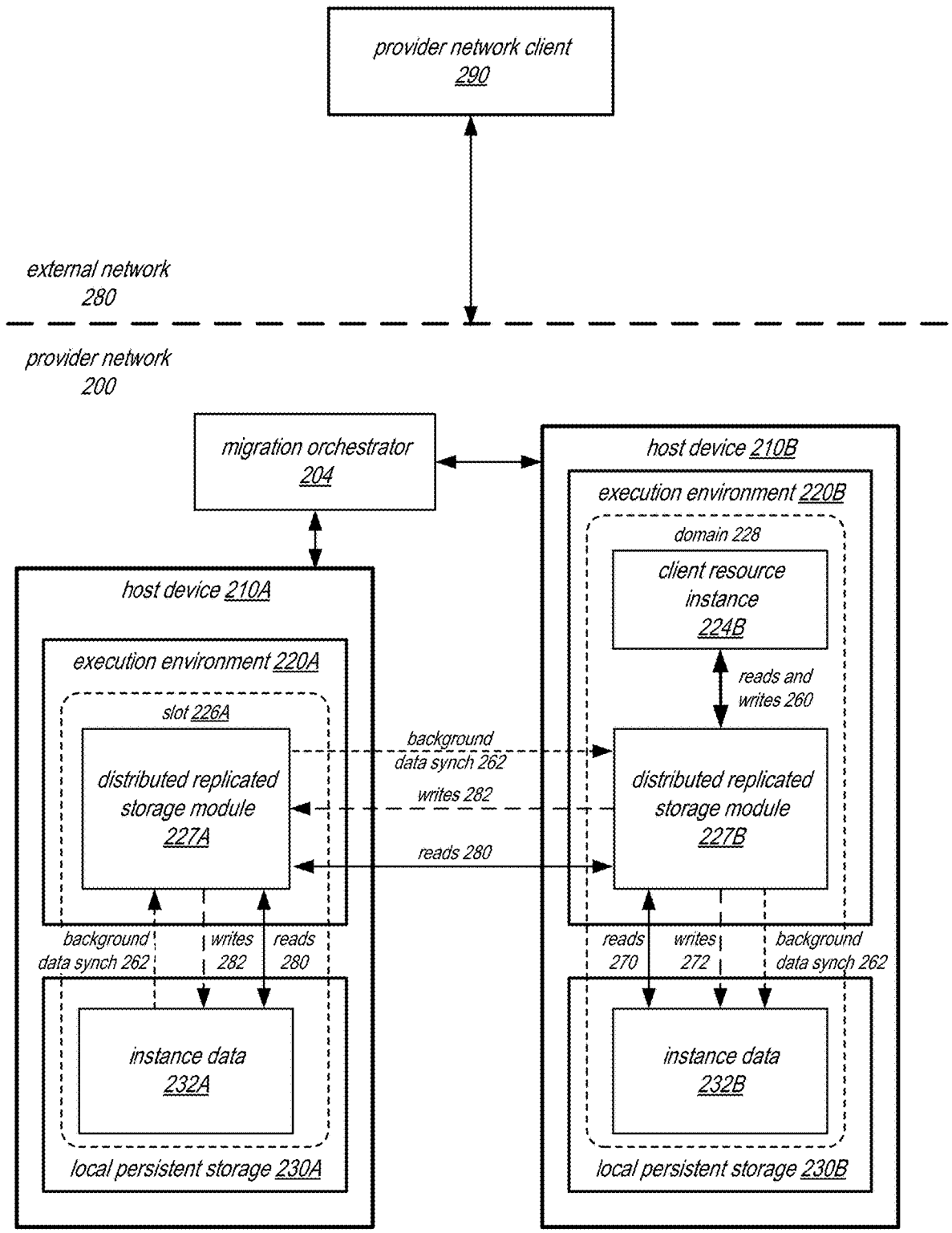

FIG. 2C graphically illustrates the domain migration process after the domain switch and during the post-switch data synchronization process. Domain 228 is now on target host device 210B, occupying slot 226A, and is available and active. However, slot 226A on host device 210A is reserved until the post-switch data synchronization is complete. Distributed replicated storage technology, for example implemented by distributed replicated storage modules 227 on the respective host devices 210, may be leveraged to perform the post-switch data synchronization process. During the post-switch data synchronization process, the domain 228 remains available and active. In some embodiments, for example, the distributed replicated storage technology may be leveraged to make the local persistent storage 230B of the target host device 210 a primary storage node for the domain 228, and make the local persistent storage 230A of the source host device 210A a secondary storage node for the domain 228. In some embodiments, the distributed replicated storage modules 227A and 227B may establish communications link(s) over the provider network 200 to perform the synchronization of the persisted instance data 232 of domain 228 from local persistent storage 230A of source host device 210A to local persistent storage 230B of target host device 210B. The distributed replicated storage modules 227A and 227B may, for example, initiate a background data synchronization 262 process that copies the instance data 232A (e.g., as blocks of data in a block-based system) from the local persistent storage 230A of source host device 210A to be stored as the instance data 232B in local persistent storage 230B of the target host device 210B over a network. The distributed replicated storage modules 227 may be implemented by program instructions executed by one or more processors of their respective hosts. For example, the distributed replicated storage modules 227 and may be implemented by a hypervisor, or virtual machine monitor (VMM), on their respective host, such as hypervisor 122 illustrated in FIG. 1. In other embodiments, a distributed replicated storage module 227 for a host may be implemented on a peripheral device of the host. The peripheral device may include a co-processor that executes program instructions to implement the distributed replicated storage module 227, e.g., under control by, or in communication with, the migration orchestrator or a hypervisor implemented by program instructions on a CPU of the host. In other embodiments, the distributed replicated storage module 227 may be implemented by program instructions executed by a processor or co-processor in an application or guest layer of the virtualization environment of the host.

The distributed replicated storage technology implemented by the distributed replicated storage modules 227 may also be leveraged to fulfill reads and writes 260 to the domain 228's persistent data during the post-switch data synchronization process. In some embodiments, data read requests for the domain 228 during the data synchronization process may be handled by distributed replicated storage module 227B on the target host device 210B first attempting to fulfill the requests from the local persistent storage 230B on the target host device 210B (reads 270). If the requested data is not available on the target host device 210B, distributed replicated storage module 227B may communicate with distributed replicated storage module 227A on source host device 210A to obtain the requested data from the local persistent storage 230A on the source host device 210A (reads 280). If the requested data is returned to the distributed replicated storage module 227B, the data may be used to fulfill the read request. In some embodiments, the data may also be stored to the persistent data storage 230B on the target host device 210B. In some embodiments, the data that is fetched from the source host device 210A to fulfill read requests and stored to the local persistent storage 230B on the target host device 210B may be marked on the source host device 210A, for example in a data synchronization table maintained by the distributed replicated storage module 227A, used to track the status of the data during the synchronization process, so that the background data synchronization 262 process knows the data has been copied and thus that the process 262 does not need to re-copy that data.

In some embodiments, data writes for the domain 228 during the data synchronization process may be stored by the distributed replicated storage module 227B on the target host device 210B to the local persistent storage 230B on the target host device 210B (writes 272), and also may be sent 282 by distributed replicated storage module 227B on the target host device 210B over the network 200 to distributed replicated storage module 227A on the source host device 210A to be stored to the local persistent storage 230A on the source host device 210A. Copying 282 the data writes to be stored as instance data 232A in local persistent storage 230 the source host device 210 may, for example, maintain consistency between the instance data 232 on the two host devices 210, and maintains the persistent data for the domain 228 on the source host device 210A in an updated and useable state if something should go wrong on the target host device 210B during the data synchronization process. For example, in some embodiments, if the target host device 210B fails during the data synchronization process, another host device 210 may be selected as a new target host device, the domain 228 may be switched to the new target host device, and the post-switch data synchronization process may be restarted to transfer the instance data 232A on the source host device 210A, which was kept up to date by the data synchronization process, to the new target host device.

In some embodiments, the migration orchestrator 204 may monitor the post-switch data synchronization process, for example to determine if there are any errors or failures, and to determine when the data synchronization is completed. For example, in some embodiments, the distributed replicated storage modules 227A and 227B may maintain data synchronization tables that indicate the status of data (e.g., blocks of data in a block-based system) during the data synchronization process. For example, the table(s) may include entries for each unit (e.g., block) of data in the instance data 232 for the domain 228, and may mark the entries to indicate which units have been copied and which are yet to be copied. The migration orchestrator 204 may access these tables to determine the status of the data synchronization, or alternatively may query one or both of the modules 227 to determine the status of the data synchronization.

Figure 2D:
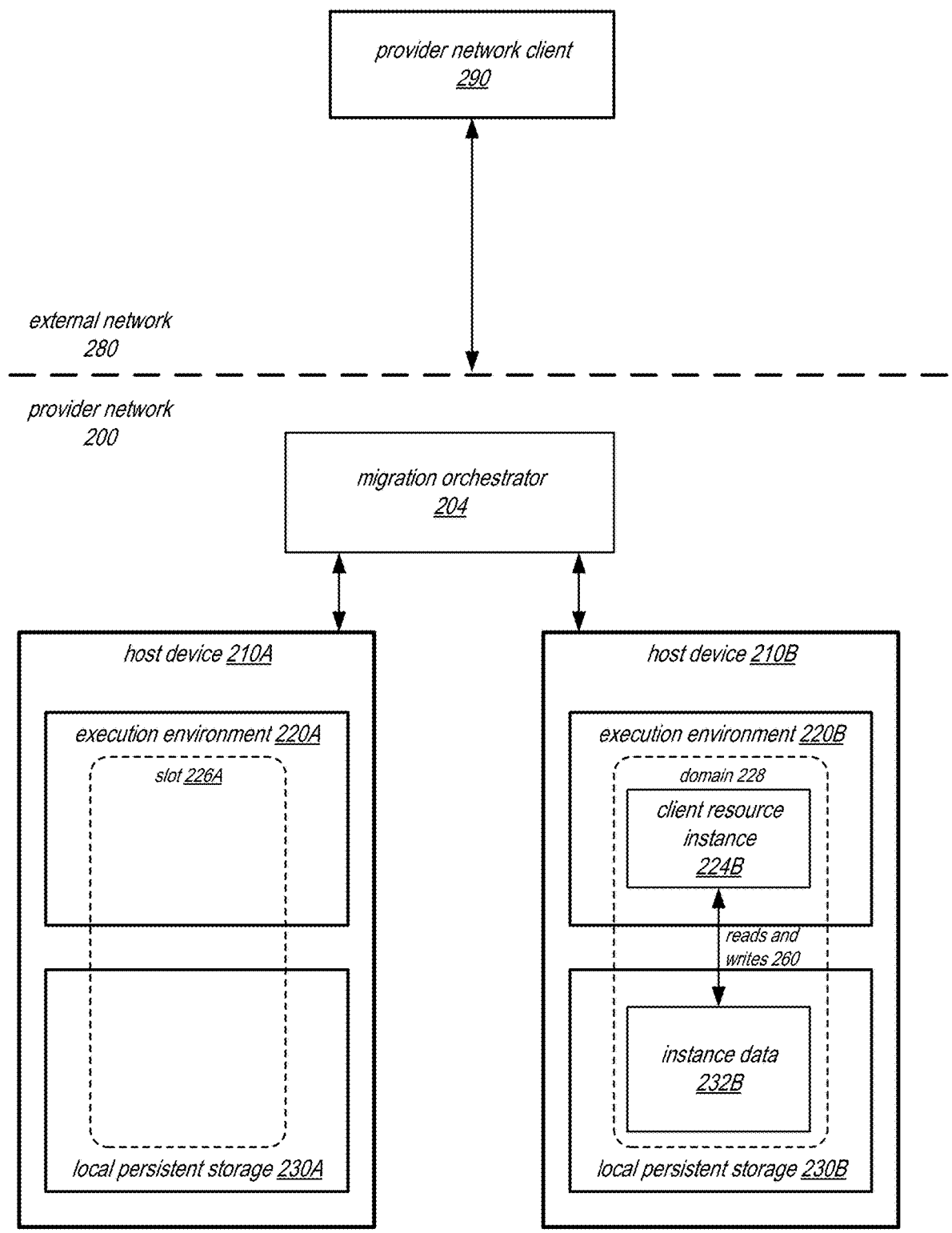
Figure 6:
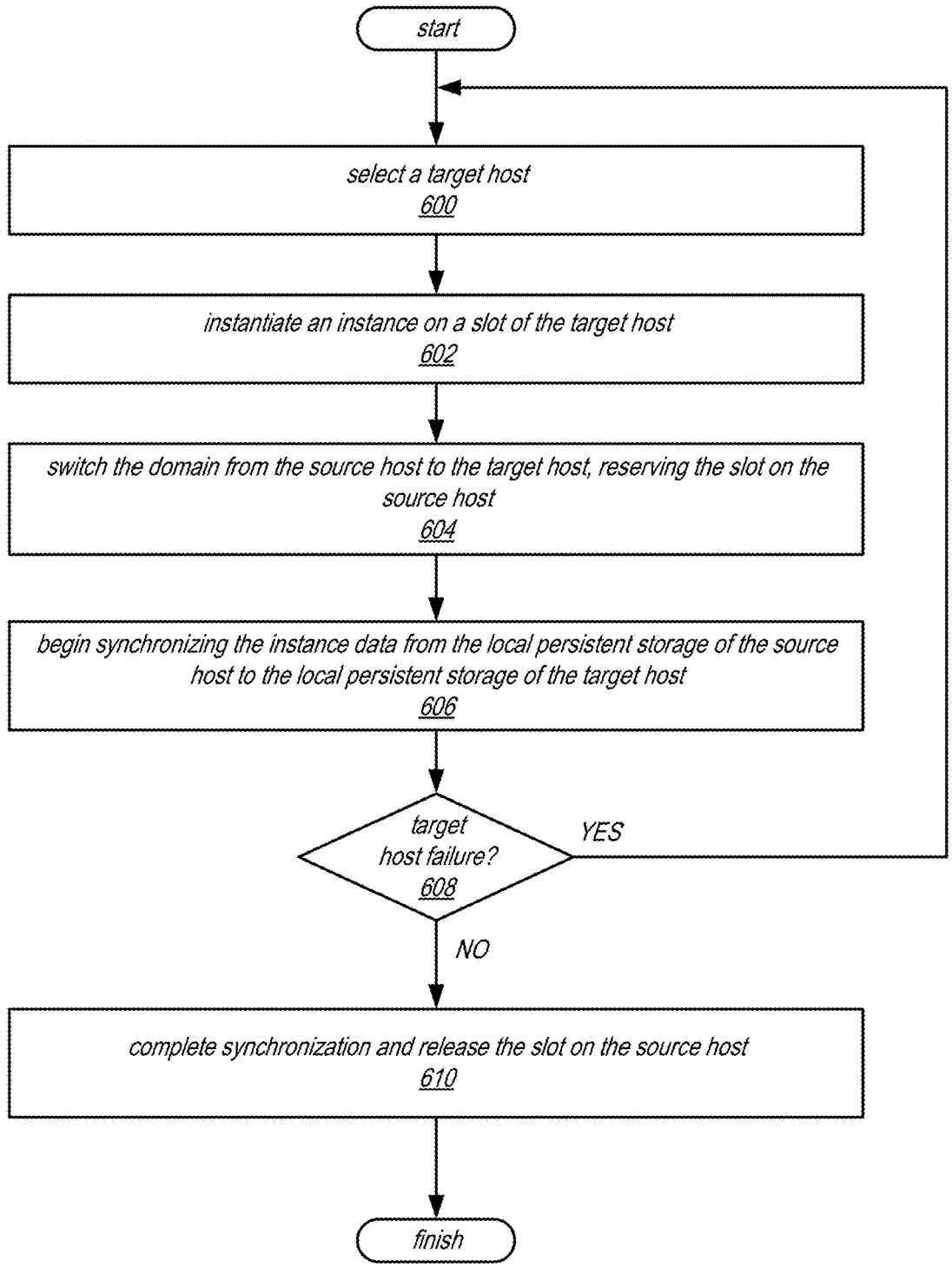
FIG. 6 is a flowchart that illustrates a method for handling failures of the target host device during a migration of a domain from a source host device to a target host device, according to some embodiments.

If the migration orchestrator 204 detects that there has been a failure (e.g., of or on the target host device 210B) during the post-switch data migration process, then a new target host device may be selected, the domain 228 may be transferred to the new target host device, and the post-switch data synchronization process may be restarted to copy the instance data 232 to the new target host device (see, e.g., FIG. 6). Otherwise, if the migration orchestrator 204 detects that the post-switch data synchronization has completed successfully, the post-switch data synchronization process is stopped and the slot 226A that was reserved on the source host device 210A during the post-switch data synchronization process is released. FIG. 2D shows the provider network 200 after successful completion of the post-switch data synchronization process, and shows that slot 226A is now free for reuse, and that the domain 228 is now executing on the target host device 210B normally. The reads and writes 260 to the persisted data of the domain 228 are now fulfilled from and to the instance data 232B stored on the local persistent storage 230B of the target host device 210B.

Figure 3:
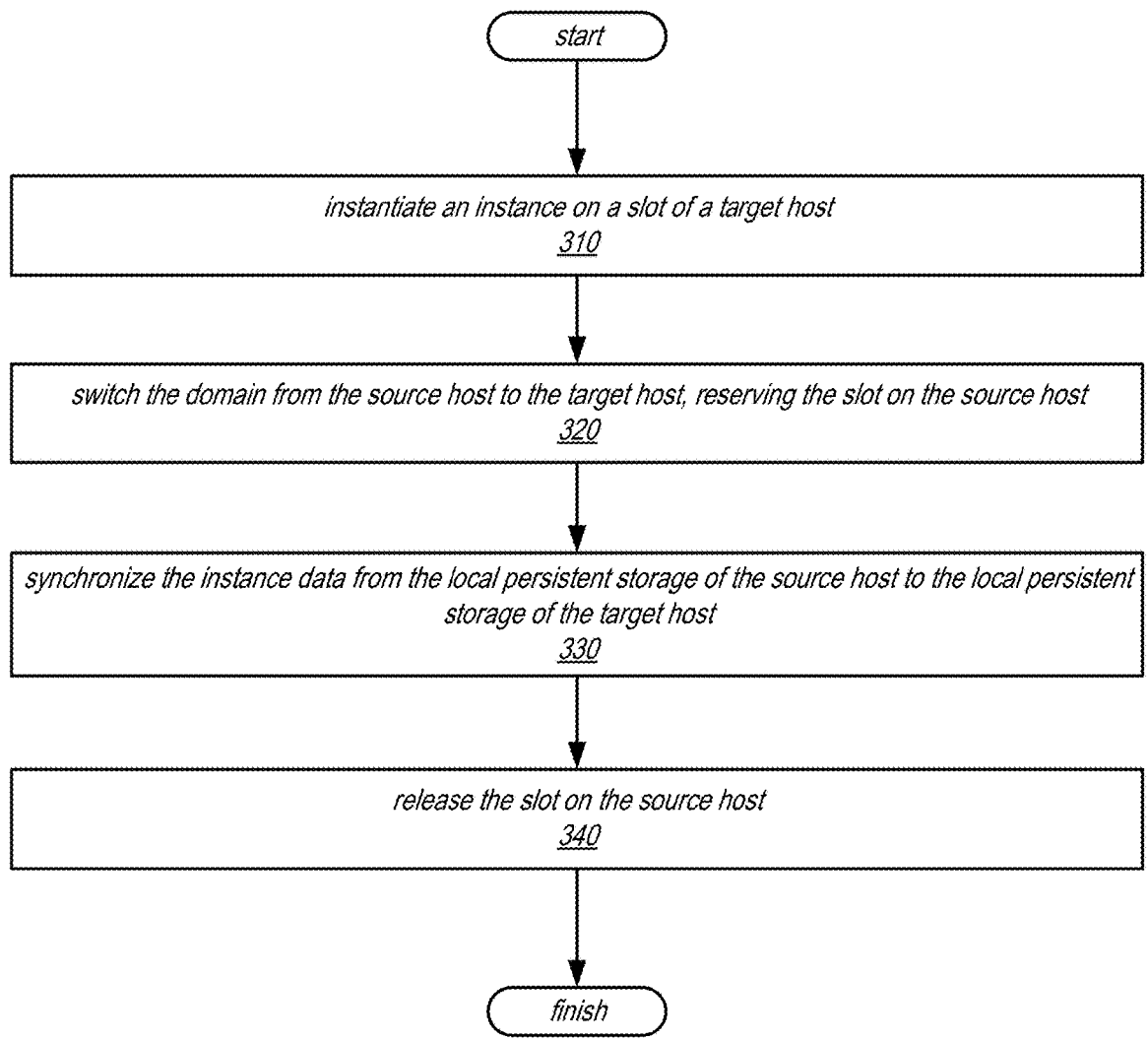
FIG. 3 is a high-level flowchart of a method for migration of a domain from a source host device to a target host device, according to some embodiments.

FIG. 3 is a high-level flowchart of a method for migration of a domain from a source host device to a target host device using a domain migration method that employs a post-switch data synchronization process, according to some embodiments. The method of claim 3 may, for example, be implemented in a network environment as illustrated in FIG. 1 to migrate domains between host devices on the provider network.

As indicated at 310 of FIG. 3, an instance of a VM for the domain may be instantiated on a slot of a target host. In some embodiments, instantiating the instance of the VM on the target host device may involve installing a machine image of the VM in the execution environment of the target host and synchronizing the state or context of the VM in the execution environment of the source host to the VM in the execution environment of the target host. The machine image may, for example, be obtained from the owner of the domain, may be retrieved from network-based storage on the network, or may be obtained from other sources. Synchronizing the state or context may, for example, involve copying content of volatile, non-persisted memory allocated to or used by the VM in the execution environment of the source host over the network to the execution environment of the target host.

As indicated at 320 of FIG. 3, after the instance of the VM is instantiated on the target host, the domain may be switched from the source host to the target host, reserving the slot on the source host. In some embodiments, the domain switch may be performed in a second or less, e.g. ~100 milliseconds. In some embodiments, switching the domain involves remapping one or more network virtual addresses from the VM on the source host to the VM on the target host. In some embodiments, if there is network-addressable storage attached to the VM on the source host, the network-addressable storage is re-attached to the VM on the target host.

As indicated at 330 of FIG. 3, the instance data from the local persistent storage of the source host may be synchronized to the local persistent storage of the target host. After switching the domain from the source host to the target host, a data synchronization process may begin transferring the persistent data for the domain from the local persistent store of the source host to the local persistent store of the target host. The persistent data store for the domain remains available and accessible during the data synchronization process; reads from and writes to the domain's persistent data may be received and processed at the domain on the target host device. In some embodiments, the data synchronization process may include launching a background synchronization process that copies data (e.g., blocks of data in a block-based system) from the source host to the target host over a network while the domain remains available and active; reads from and writes to the domain's persistent data may be performed while this background process is copying the data.

In some embodiments, data read requests for the domain during the data synchronization process may be handled by first attempting to fulfill the requests from the persistent data storage on the target host and, if the requested data is not available on the target host, fetching the requested data from the persistent data storage on the source host. The fetched data may be used to fulfill the read requests, and may also be stored to the persistent data storage on the target host. In some embodiments, data writes for the domain during the data synchronization process may be stored to the persistent data storage on the target host device, and also may be copied over the network to be stored to the persistent data storage on the source host device. Copying the data writes to the source host device may, for example, maintain consistency between the data sets on the two host devices, and maintain the persistent data for the domain on the source host device in an updated and useable state if something should go wrong on the target host device during the data synchronization process.

As indicated at 340 of FIG. 3, the slot on the source host that was previously occupied by the domain and that was reserved during the post-switch data synchronization process may be released after the data synchronization process has been completed.

Figure 4:
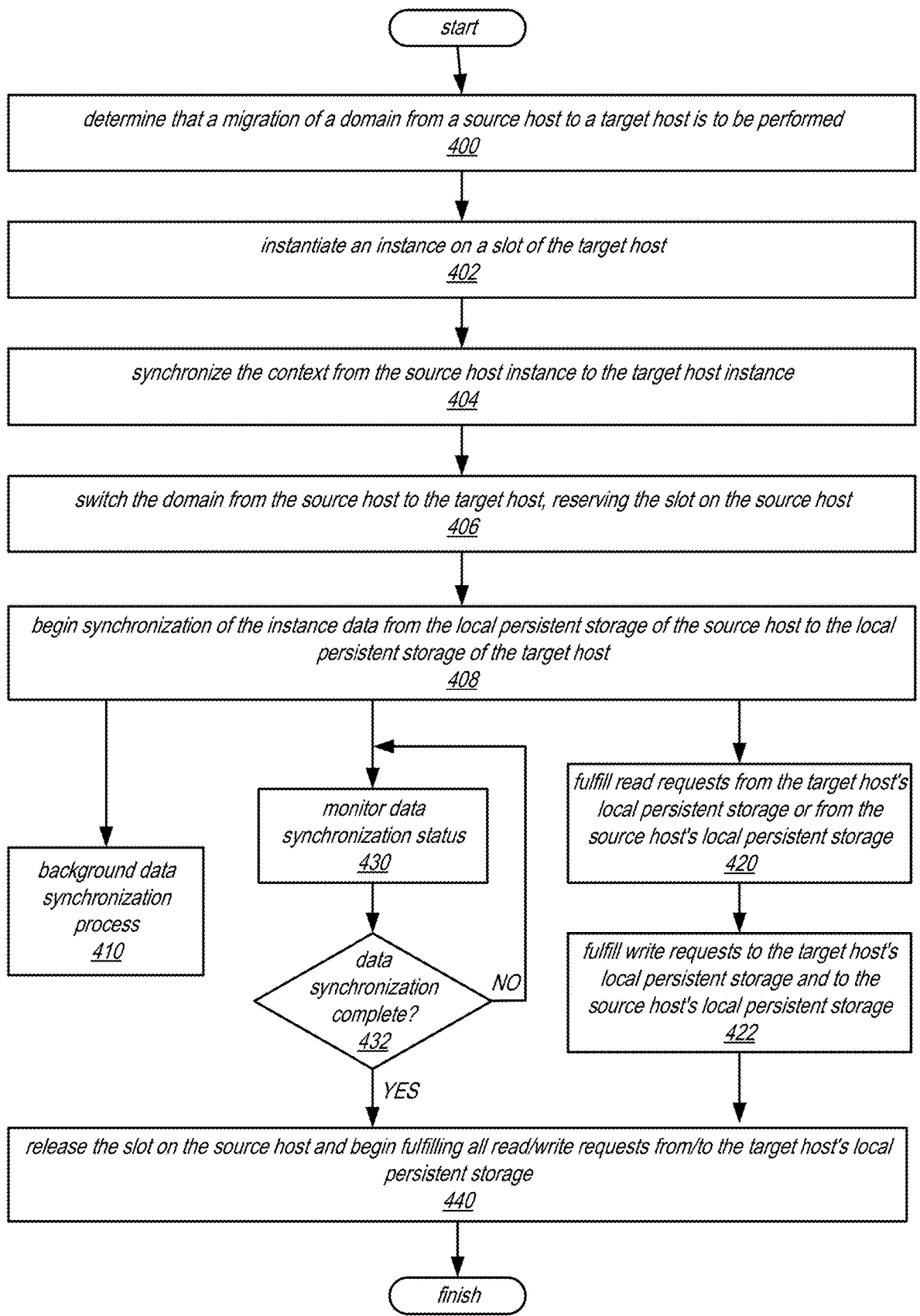
FIG. 4 provides a more detailed flowchart of a method for migration of a domain from a source host device to a target host device, according to some embodiments.

FIG. 4 provides a more detailed flowchart of a method for migration of a domain from a source host device to a target host device using a domain migration method that employs a post-switch data synchronization process, according to some embodiments. The method of claim 4 may, for example, be implemented in a network environment as illustrated in FIG. 1 to migrate domains between host devices on the provider network.

As indicated at 400 of FIG. 4, a migration orchestrator on the network may determine that a migration of a domain from a source host to a target host is to be performed. In some embodiments, a migration system, service, or module, referred to as a migration orchestrator, may be implemented by one or more devices on a network to manage domain migration. In some embodiments, the migration orchestrator may determine that the domain is to be migrated from the source host to anther host on the network. For example, a process or service on the network may direct the migration orchestrator to migrate the domain to a different host so that the source host can be taken offline or out of service for maintenance, or for other reasons such as host load distribution. As another example, the owner of the domain may request that the domain be moved to another host. The migration orchestrator may also determine the target host for the migration. In some embodiments, for example, a particular host on the network may be specified as the target host for the migration by the entity that is requesting the migration. Alternatively, the migration orchestrator may determine or select the target host for the migration, for example by polling hosts on the network to find a host with a free slot.

As indicated at 402 of FIG. 4, an instance of a VM for the domain may be instantiated on a slot of a target host. In some embodiments, instantiating the instance of the VM on the target host device may involve installing a machine image of the VM in the execution environment of the target host. The machine image may, for example, be obtained from the owner of the domain, may be retrieved from network-based storage on the network, or may be obtained from other sources.

As indicated at 404 of FIG. 4, after the instance of the VM is instantiated on the target host, the context from the source host instance may be synchronized to the target host instance. Synchronizing the state or context may, for example, involve copying content of volatile, non-persisted memory allocated to or used by the VM in the execution environment of the source host over the network to the execution environment of the target host.

As indicated at 406 of FIG. 4, after the context has been synchronized on the target host, the domain may be switched from the source host to the target host, reserving the slot on the source host. In some embodiments, the domain switch may be performed in a second or less, e.g. ~100 milliseconds. In some embodiments, switching the domain involves remapping one or more network virtual addresses from the VM on the source host to the VM on the target host. In some embodiments, if there is network-addressable storage attached to the VM on the source host, the network-addressable storage is re-attached to the VM on the target host.

As indicated at 408 of FIG. 4, after the domain switch, synchronization of the instance data from the local persistent storage of the source host to the local persistent storage of the target host may be initiated. After switching the domain from the source host to the target host, a data synchronization process may begin transferring the persistent data for the domain from the local persistent store of the source host to the local persistent store of the target host. The persistent data store for the domain remains available and accessible during the data synchronization process. In some embodiments, the post-switch data synchronization may be performed according to distributed replicated storage technology implemented by the source and target hosts, for example as illustrated in FIG. 2C.

As indicated at 410 of FIG. 4, as part of the data synchronization process, a background data synchronization process may be launched to perform background copying of the domain's persistent data from the local persistent storage of the source host to the local persistent storage of the target host over the network, for example as illustrated in FIG. 2C. The distributed replicated storage technology may, for example, be leveraged to implement a background data synchronization process that copies data (e.g., blocks of data in a block-based system) from the source host device to the target host device over a network while the domain remains available and active on the target host.

Elements 420 and 422 may be performed substantially in parallel with the background data synchronization process 410.

Figure 5:
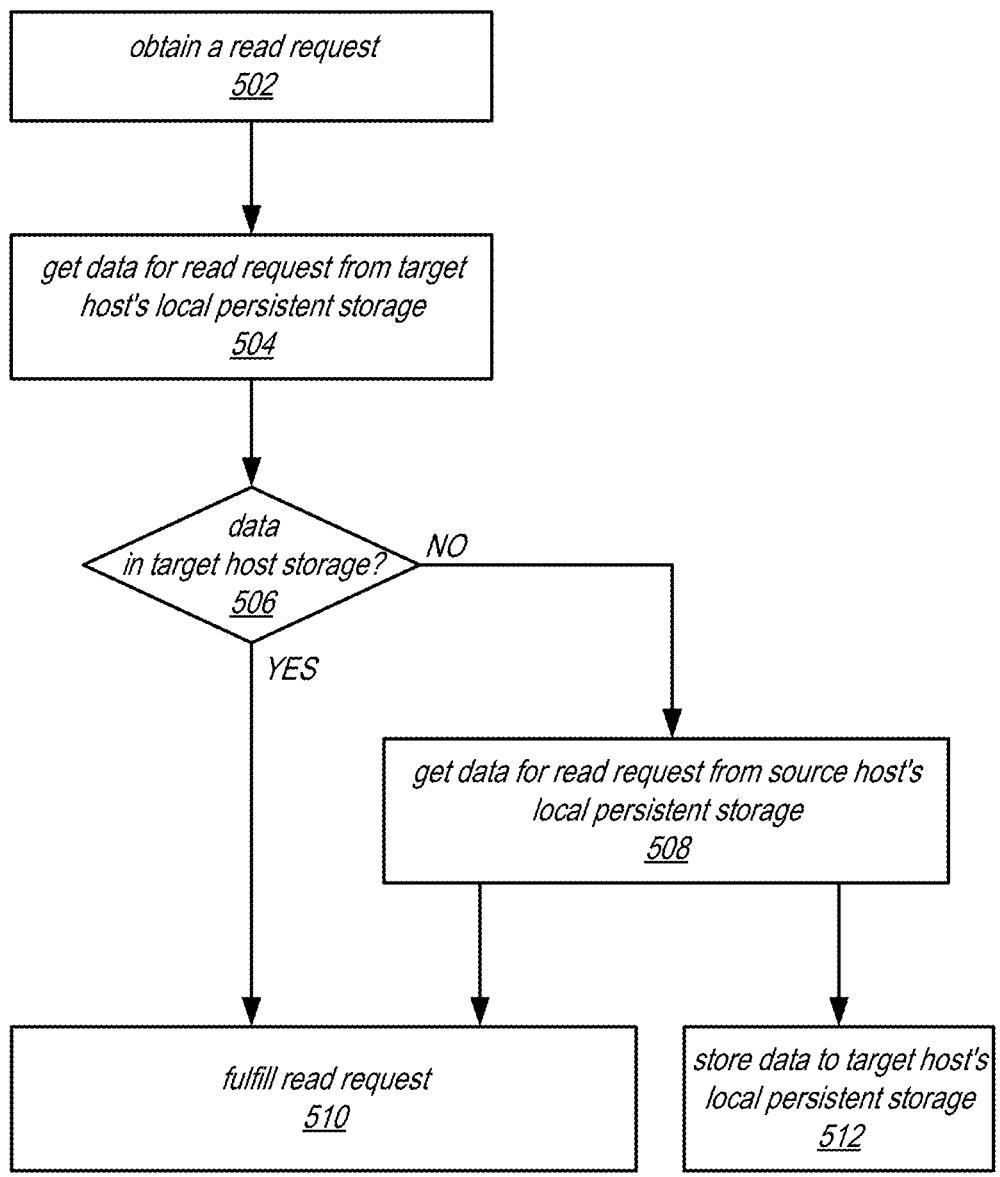
FIG. 5 is a flowchart that illustrates fulfilling read requests during a migration of a domain from a source host device to a target host device, according to some embodiments.

As indicated at 420 of FIG. 4, during the data synchronization process, read requests may be fulfilled from the target host's local persistent storage or from the source host's local persistent storage. In some embodiments, the distributed replicated storage technology may be leveraged to fulfill reads from the domain's persistent data during the post-switch data synchronization process. In some embodiments, data read requests for the domain during the data synchronization process may be handled by first attempting to fulfill the requests from the local persistent storage on the target host. If the requested data is not available on the target host, the requested data may be fetched from the local persistent storage on the source host. If the requested data is successfully fetched from the source host, the data may be used to fulfill the read request. In some embodiments, the fetched data may also be stored to the persistent data storage on the target host. FIG. 5 shows a flowchart of a method for fulfilling read requests during the post-switch data synchronization process, according to some embodiments.

As indicated at 422 of FIG. 4, during the data synchronization process, write requests may be fulfilled to the target host's local persistent storage and to the source host's local persistent storage. In some embodiments, the distributed replicated storage technology may be leveraged to fulfill writes to the domain's persistent data during the post-switch data synchronization process. In some embodiments, data writes for the domain during the data synchronization process may be stored to the local persistent storage on the target host, and also may be sent over the network 20 to the source host to be stored to the local persistent storage on the source host. Copying the data writes to the source host may, for example, maintain consistency between the domain's persistent data on the two hosts, and maintains the persistent data for the domain on the source host in a current and useable state if something should go wrong on the target host during the data synchronization process.

Elements 430 and 432 may be performed substantially in parallel with the background data synchronization process 410 and with elements 420 and 422.

As indicated at 430 of FIG. 4, during the data synchronization process, the migration orchestrator may monitor data synchronization status, for example to determine if there are any errors or failures, and to determine when the data synchronization is completed. For example, in some embodiments, the distributed replicated storage technology implemented by the hosts may maintain data synchronization information that indicates the status of the data synchronization process. The migration orchestrator may access this information to determine the status of the data synchronization, or alternatively may query one or both of the hosts to determine the status of the data synchronization.

In some embodiments, if the migration orchestrator detects that there has been a failure (e.g., of or on the target host de) during the post-switch data migration process, then a new target host may be selected, the domain may be transferred to the new target host, and the post-switch data synchronization process may be restarted to copy the persistent data for the domain from the source host to the new target host (see, e.g., FIG. 6).

At 432 of FIG. 4, if the migration orchestrator detects that the post-switch data synchronization is complete, then the method goes to element 440. As indicated at 440 of FIG. 4, after the data synchronization process is complete, the slot on the source host may be released, and all read/write requests may be fulfilled from/to the target host's local persistent storage.

FIG. 5 is a flowchart that illustrates fulfilling read requests during a migration of a domain from a source host device to a target host device, according to some embodiments. The method of FIG. 5 may, for example, be performed according to a distributed replicated storage technique implemented by distributed replicated storage modules on the source and target host devices during the data synchronization process. The method of FIG. 5 may, for example, be performed at element 422 of FIG. 4.

As indicated at 502 of FIG. 5, a distributed replicated storage module on the target host may obtain a read request for the domain. As indicated at 504 of FIG. 5, a distributed replicated storage module on the target host may attempt to get data to fulfill the read request from the target host's local persistent storage. At 506 of FIG. 5, if the data to satisfy the read request is in the target host storage, then the read request may be fulfilled using the data from the target host storage as indicated at 510. Otherwise, the method goes to element 508 of FIG. 5. At 508, the distributed replicated storage module on the target host may communicate with the distributed replicated storage module on the source host to get data for the read request from the source host's local persistent storage. If the data to satisfy the read request is available on and returned from the source host, then the read request may be fulfilled as indicated at 510 using the data from the source host storage. In some embodiments, the data obtained from the source host may also be stored to the target host's local persistent storage, as indicated at 512.

FIG. 6 is a flowchart that illustrates a method for handling failures of the target host device during a migration of a domain from a source host device to a target host device using a domain migration method that employs a post-switch data synchronization process, according to some embodiments. The method of claim 6 may, for example, be implemented in a network environment as illustrated in FIG. 1 when migrating domains between host devices on the provider network.

As indicated at 600 of FIG. 6, a target host for the migration may be selected. For example, a migration orchestrator on the network as illustrated in FIGS. 2A through 2D may determine or select the target host for the migration, for example by polling hosts on the network to find a host with a free slot.

As indicated at 602 of FIG. 6, an instance of a VM for the domain may be instantiated on a slot of the selected target host. In some embodiments, instantiating the instance of the VM on the target host device may involve installing a machine image of the VM in the execution environment of the target host and synchronizing the state or context of the VM in the execution environment of the source host to the VM in the execution environment of the target host.

As indicated at 604 of FIG. 6, after the instance of the VM is instantiated on the target host, the domain may be switched from the source host to the target host, reserving the slot on the source host. In some embodiments, switching the domain involves remapping one or more network virtual addresses from the VM on the source host to the VM on the target host. In some embodiments, if there is network-addressable storage attached to the VM on the source host, the network-addressable storage is re-attached to the VM on the target host.

As indicated at 606 of FIG. 6, synchronization of the instance data from the local persistent storage of the source host to the local persistent storage of the target host may be initiated. After switching the domain from the source host to the target host, a data synchronization process may begin transferring the persistent data for the domain from the local persistent store of the source host to the local persistent store of the target host. The persistent data store for the domain remains available and accessible during the data synchronization process; reads from and writes to the domain's persistent data may be received and processed at the domain on the target host device. In some embodiments, the data synchronization process may include launching a background synchronization process that copies data (e.g., blocks of data in a block-based system) from the source host to the target host over a network while the domain remains available and active; reads from and writes to the domain's persistent data may be performed while this background process is copying the data.

At 608 of FIG. 6, if a target host failure is detected during the data synchronization process, then the method may return to element 600 to select another target host and start the migration process over again with the new target host. Otherwise, once the data synchronization process has successfully completed, the method may proceed to element 610 of FIG. 6, where the data synchronization is completed and the slot on the source host is released.

Example Provider Network Environments

This section describes example provider network environments in which embodiments of the methods and apparatus for post data synchronization in migration of domains in provider network environments as described in reference to FIGS. 1 through 6 may be implemented. However, these example provider network environments are not intended to be limiting.

Figure 7:
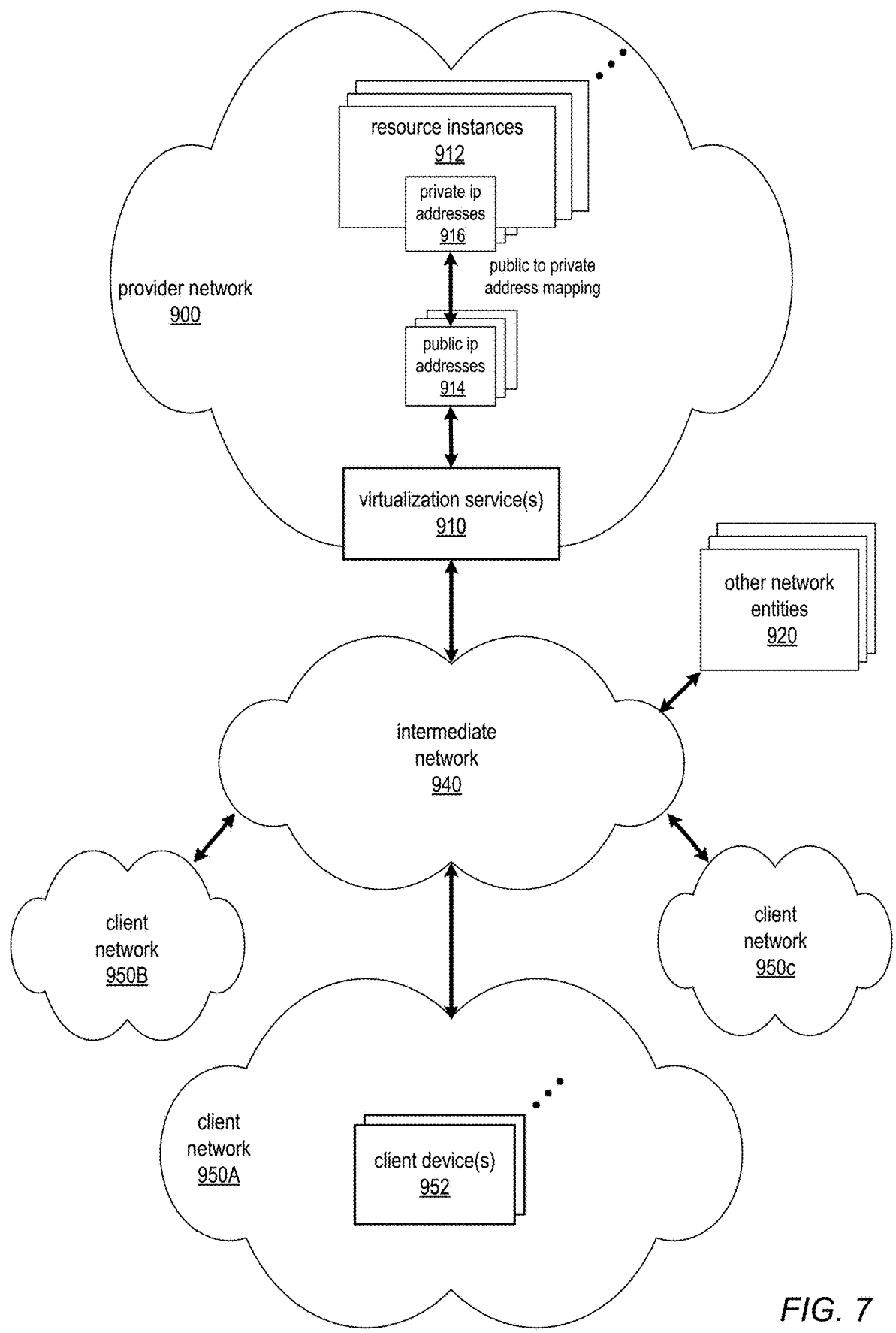
FIG. 7 illustrates an example provider network environment, according to some embodiments.

FIG. 7 illustrates an example provider network environment, according to some embodiments. A provider network 900 may provide resource virtualization to clients via one or more virtualization services 910 that allow clients to purchase, rent, or otherwise obtain instances 912 of virtualized resources, including but not limited to computation and storage resources, implemented on devices within the provider network or networks in one or more data centers. Private IP addresses 916 may be associated with the resource instances 912; the private IP addresses are the internal network addresses of the resource instances 912 on the provider network 900. In some embodiments, the provider network 900 may also provide public IP addresses 914 and/or public IP address ranges (e.g., Internet Protocol version 4 (IPv4) or Internet Protocol version 6 (IPv6) addresses) that clients may obtain from the provider 900.

Conventionally, the provider network 900, via the virtualization services 910, may allow a client of the service provider (e.g., a client that operates client network 950A) to dynamically associate at least some public IP addresses 914 assigned or allocated to the client with particular resource instances 912 assigned to the client. The provider network 900 may also allow the client to remap a public IP address 914, previously mapped to one virtualized computing resource instance 912 allocated to the client, to another virtualized computing resource instance 912 that is also allocated to the client. Using the virtualized computing resource instances 912 and public IP addresses 914 provided by the service provider, a client of the service provider such as the operator of client network 950A may, for example, implement client-specific applications and present the client's applications on an intermediate network 940, such as the Internet. Other network entities 920 on the intermediate network 940 may then generate traffic to a destination public IP address 914 published by the client network 950A; the traffic is routed to the service provider data center, and at the data center is routed, via a network substrate, to the private IP address 916 of the virtualized computing resource instance 912 currently mapped to the destination public IP address 914. Similarly, response traffic from the virtualized computing resource instance 912 may be routed via the network substrate back onto the intermediate network 940 to the source entity 920.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include network devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a private IP address of a resource instance is the default launch configuration for all resource instance types.

At least some public IP addresses may be allocated to or obtained by clients of the provider network 900; a client may then assign their allocated public IP addresses to particular resource instances allocated to the client. These public IP addresses may be referred to as client public IP addresses, or simply client IP addresses. Instead of being assigned by the provider network 900 to resource instances as in the case of standard IP addresses, client IP addresses may be assigned to resource instances by the clients, for example via an API provided by the service provider. Unlike standard IP addresses, client IP Addresses are allocated to client accounts and can be remapped to other resource instances by the respective clients as necessary or desired. A client IP address is associated with a client's account, not a particular resource instance, and the client controls that IP address until the client chooses to release it. Unlike conventional static IP addresses, client IP addresses allow the client to mask resource instance or availability zone failures by remapping the client's public IP addresses to any resource instance associated with the client's account. The client IP addresses, for example, enable a client to engineer around problems with the client's resource instances or software by remapping client IP addresses to replacement resource instances.

Figure 8:
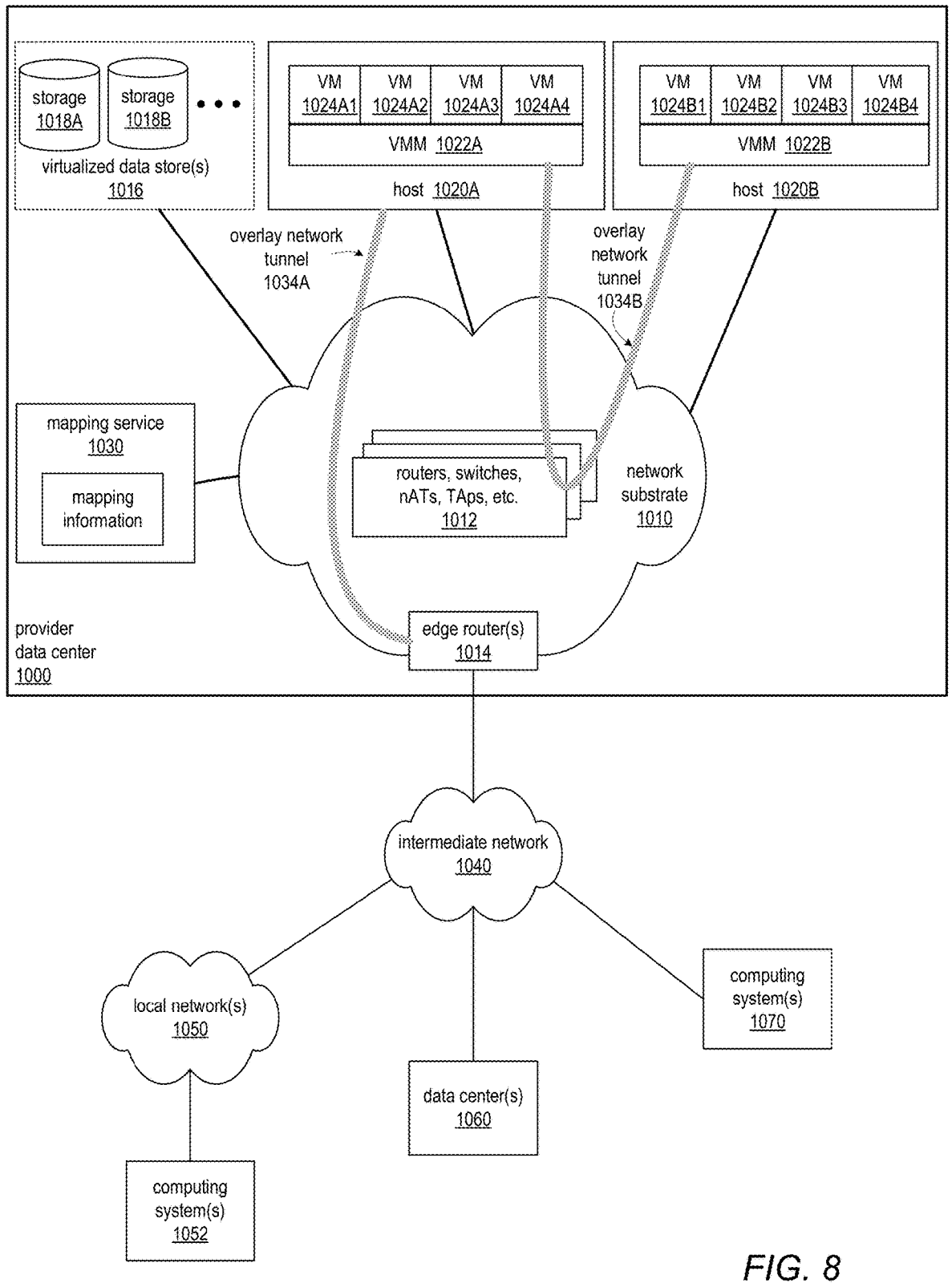
FIG. 8 illustrates an example data center that implements an overlay network on a network substrate using IP tunneling technology, according to some embodiments.

FIG. 8 illustrates an example data center that implements an overlay network on a network substrate using IP tunneling technology, according to some embodiments. A provider data center 1000 may include a network substrate that includes networking devices 1012 such as routers, switches, network address translators (NATs), and so on. Some embodiments may employ an Internet Protocol (IP) tunneling technology to provide an overlay network via which encapsulated packets may be passed through network substrate 1010 using tunnels. The IP tunneling technology may provide a mapping and encapsulating system for creating an overlay network on a network (e.g., a local network in data center 1000 of FIG. 8) and may provide a separate namespace for the overlay layer (the public IP addresses) and the network substrate 1010 layer (the private IP addresses). Packets in the overlay layer may be checked against a mapping directory (e.g., provided by mapping service 1030) to determine what their tunnel substrate target (private IP address) should be. The IP tunneling technology provides a virtual network topology (the overlay network); the interfaces (e.g., service APIs) that are presented to clients are attached to the overlay network so that when a client provides an IP address to which the client wants to send packets, the IP address is run in virtual space by communicating with a mapping service (e.g., mapping service 1030) that knows where the IP overlay addresses are.

In some embodiments, the IP tunneling technology may map IP overlay addresses (public IP addresses) to substrate IP addresses (private IP addresses), encapsulate the packets in a tunnel between the two namespaces, and deliver the packet to the correct endpoint via the tunnel, where the encapsulation is stripped from the packet. In FIG. 8, an example overlay network tunnel 1034A from a virtual machine (VM) 1024A on host 1020A to a device on the intermediate network 1050 and an example overlay network tunnel 1034B between a VM 1024B on host 1020B and a VM 1024C on host 1020C are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (private IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the private IP addresses.

Referring to FIG. 8, at least some networks in which embodiments may be implemented may include hardware virtualization technology that enables multiple operating systems to run concurrently on a host computer (e.g., hosts 1020A and 1020B of FIG. 8), i.e. as virtual machines (VMs) 1024 on the hosts 1020. The VMs 1024 may, for example, be rented or leased to clients of a network provider. A hypervisor, or virtual machine monitor (VMM) 1022, on a host 1020 presents the VMs 1024 on the host with a virtual platform and monitors the execution of the VMs 1024. Each VM 1024 may be provided with one or more private IP addresses; the VMM 1022 on a host 1020 may be aware of the private IP addresses of the VMs 1024 on the host. A mapping service 1030 may be aware of all network IP prefixes and the IP addresses of routers or other devices serving IP addresses on the local network. This includes the IP addresses of the VMMs 1022 serving multiple VMs 1024. The mapping service 1030 may be centralized, for example on a server system, or alternatively may be distributed among two or more server systems or other devices on the network. A network may, for example, use the mapping service technology and IP tunneling technology to, for example, route data packets between VMs 1024 on different hosts 1020 within the data center 1000 network; note that an interior gateway protocol (IGP) may be used to exchange routing information within such a local network.

In addition, a network such as the provider data center 1000 network (which is sometimes referred to as an autonomous system (AS)) may use the mapping service technology, IP tunneling technology, and routing service technology to route packets from the VMs 1024 to Internet destinations, and from Internet sources to the VMs 1024. Note that an external gateway protocol (EGP) or border gateway protocol (BGP) is typically used for Internet routing between sources and destinations on the Internet. FIG. 8 shows an example provider data center 1000 implementing a network that provides resource virtualization technology and that provides full Internet access via edge router(s) 1014 that connect to Internet transit providers, according to some embodiments. The provider data center 1000 may, for example, provide clients the ability to implement virtual computing systems (VMs 1024) via a hardware virtualization service and the ability to implement virtualized data stores 1016 on storage resources 1018 via a storage virtualization service.

The data center 1000 network may implement IP tunneling technology, mapping service technology, and a routing service technology to route traffic to and from virtualized resources, for example to route packets from the VMs 1024 on hosts 1020 in data center 1000 to Internet destinations, and from Internet sources to the VMs 1024. Internet sources and destinations may, for example, include computing systems 1070 connected to the intermediate network 1040 and computing systems 1052 connected to local networks 1050 that connect to the intermediate network 1040 (e.g., via edge router(s) 1014 that connect the network 1050 to Internet transit providers). The provider data center 1000 network may also route packets between resources in data center 1000, for example from a VM 1024 on a host 1020 in data center 1000 to other VMs 1024 on the same host or on other hosts 1020 in data center 1000.

A service provider that provides data center 1000 may also provide additional data center(s) 1060 that include hardware virtualization technology similar to data center 1000 and that may also be connected to intermediate network 1040. Packets may be forwarded from data center 1000 to other data centers 1060, for example from a VM 1024 on a host 1020 in data center 1000 to another VM on another host in another, similar data center 1060, and vice versa.

While the above describes hardware virtualization technology that enables multiple operating systems to run concurrently on host computers as virtual machines (VMs) on the hosts, where the VMs may be rented or leased to clients of the network provider, the hardware virtualization technology may also be used to provide other computing resources, for example storage resources 1018, as virtualized resources to clients of a network provider in a similar manner.

Figure 9:
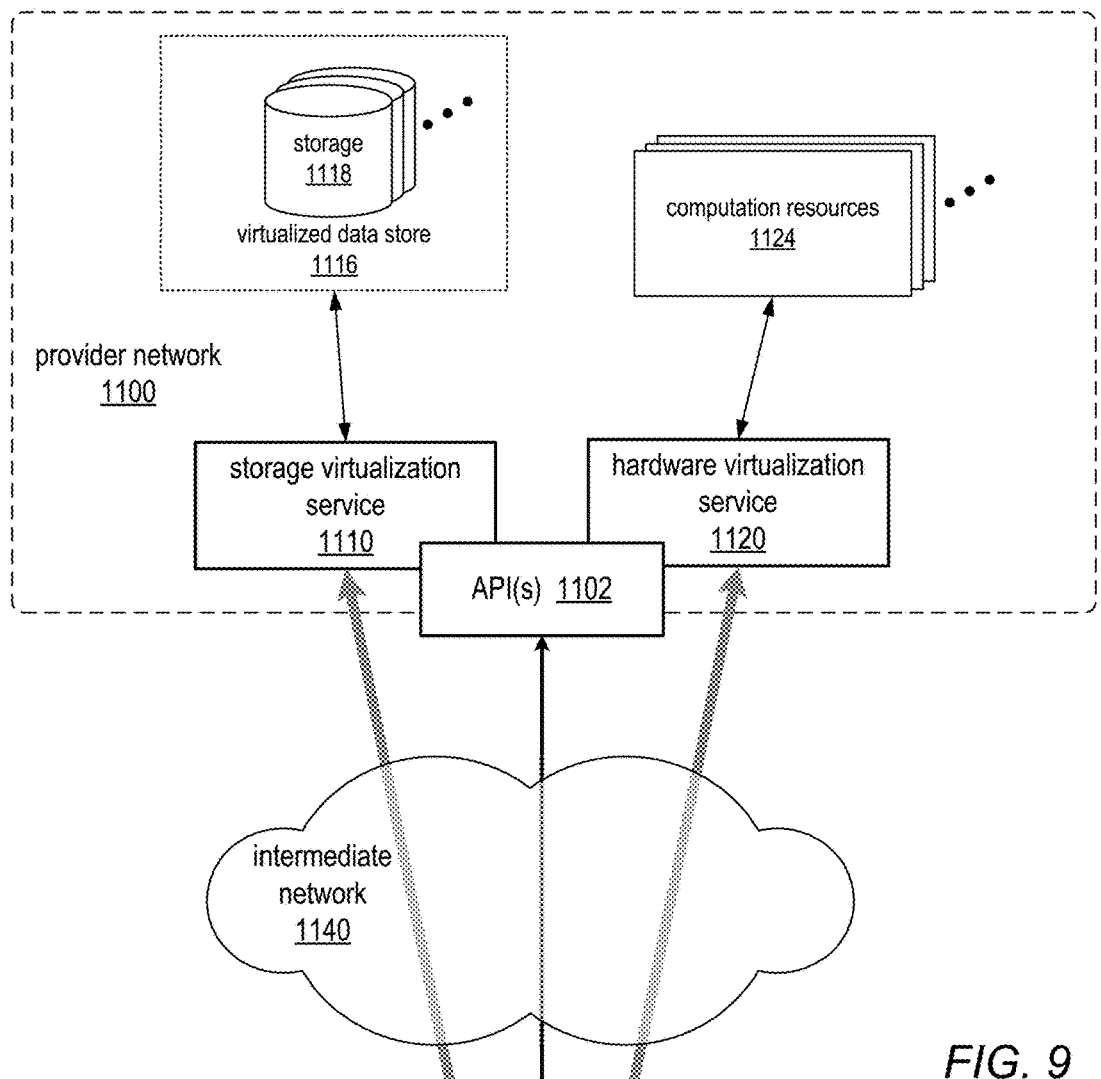
FIG. 9 is a block diagram of an example provider network that provides a storage virtualization service and a hardware virtualization service to clients, according to some embodiments.
Figure 9:
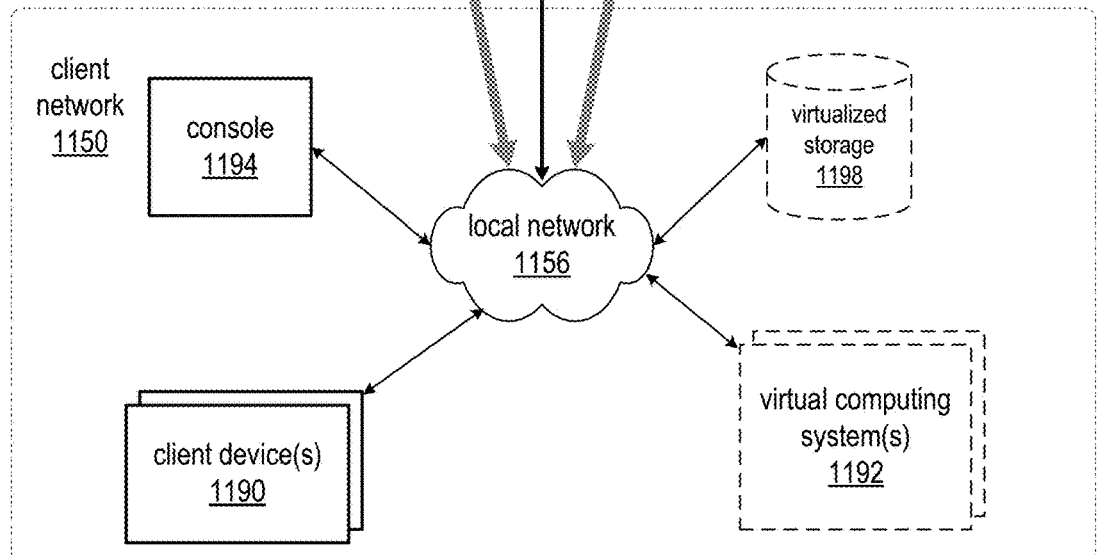

FIG. 9 is a block diagram of an example provider network that provides a storage virtualization service and a hardware virtualization service to clients, according to some embodiments. Hardware virtualization service 1120 provides multiple computation resources 1124 (e.g., VMs) to clients. The computation resources 1124 may, for example, be rented or leased to clients of the provider network 1100 (e.g., to a client that implements client network 1150). Each computation resource 1124 may be provided with one or more private IP addresses. Provider network 1100 may be configured to route packets from the private IP addresses of the computation resources 1124 to public Internet destinations, and from public Internet sources to the computation resources 1124.

Provider network 1100 may provide a client network 1150, for example coupled to intermediate network 1140 via local network 1156, the ability to implement virtual computing systems 1192 via hardware virtualization service 1120 coupled to intermediate network 1140 and to provider network 1100. In some embodiments, hardware virtualization service 1120 may provide one or more APIs 1102, for example a web services interface, via which a client network 1150 may access functionality provided by the hardware virtualization service 1120, for example via a console 1194. In some embodiments, at the provider network 1100, each virtual computing system 1192 at client network 1150 may correspond to a computation resource 1124 that is leased, rented, or otherwise provided to client network 1150.

From an instance of a virtual computing system 1192 and/or another client device 1190 or console 1194, the client may access the functionality of storage virtualization service 1110, for example via one or more APIs 1102, to access data from and store data to a virtual data store 1116 provided by the provider network 1100. In some embodiments, a virtualized data store gateway (not shown) may be provided at the client network 1150 that may locally cache at least some data, for example frequently accessed or critical data, and that may communicate with virtualized data store service 1110 via one or more communications channels to upload new or modified data from a local cache so that the primary store of data (virtualized data store 1116) is maintained. In some embodiments, a user, via a virtual computing system 1192 and/or on another client device 1190, may mount and access virtual data store 1116 volumes, which appear to the user as local virtualized storage 1198.

While not shown in FIG. 9, the virtualization service(s) may also be accessed from resource instances within the provider network 1100 via API(s) 1102. For example, a client, appliance service provider, or other entity may access a virtualization service from within a respective private network on the provider network 1100 via an API 1102 to request allocation of one or more resource instances within the private network or within another private network.

Figure 10:
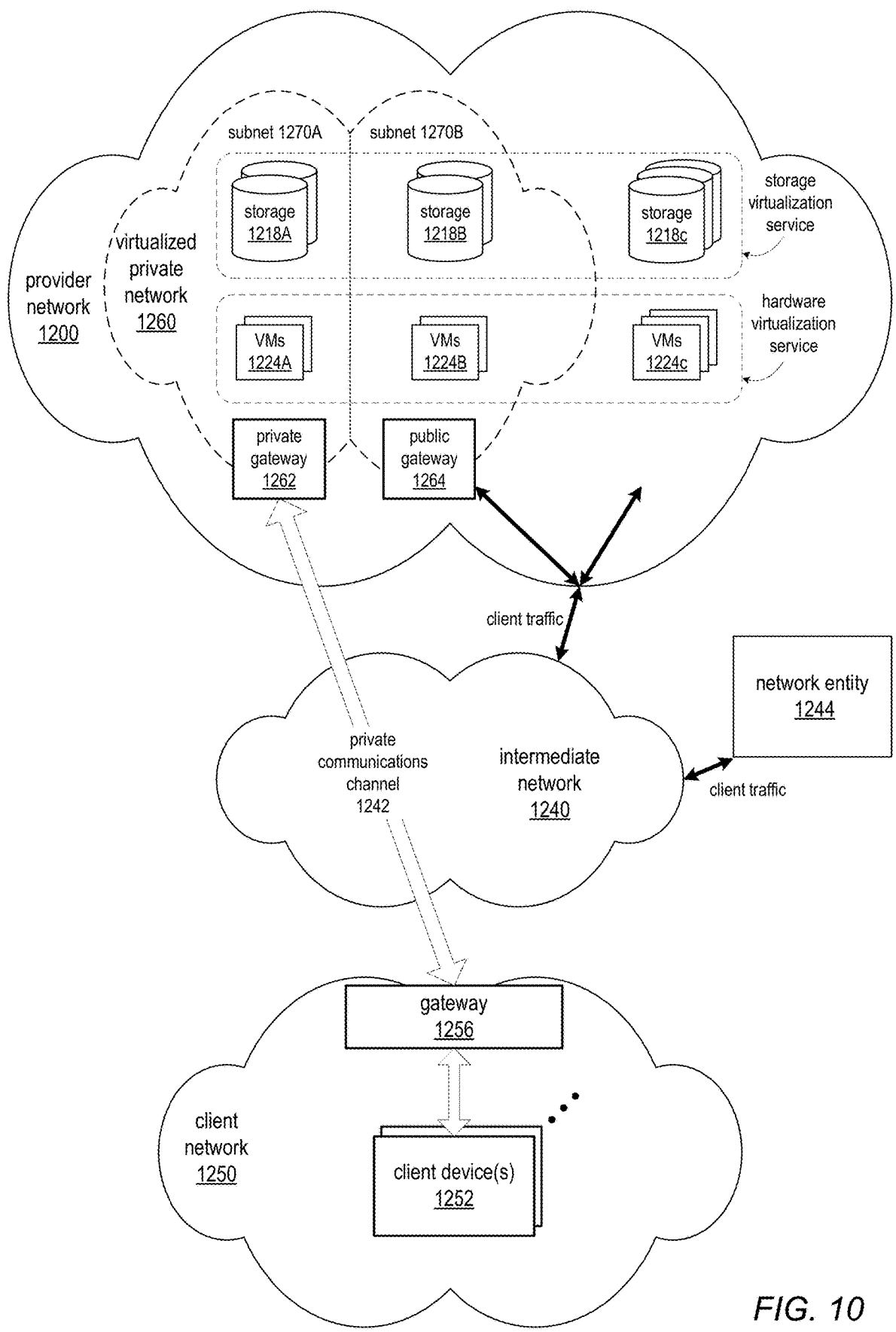
FIG. 10 illustrates an example provider network that provides virtualized private networks to at least some clients, according to some embodiments.

FIG. 10 illustrates an example provider network that provides private networks on the provider network to at least some clients, according to some embodiments. A client's virtualized private network 1260 on a provider network 1200, for example, enables a client to connect their existing infrastructure (e.g., devices 1252) on client network 1250 to a set of logically isolated resource instances (e.g., VMs 1224A and 1224B and storage 1218A and 1218B), and to extend management capabilities such as security services, firewalls, and intrusion detection systems to include their resource instances.

A client's virtualized private network 1260 may be connected to a client network 1250 via a private communications channel 1242. A private communications channel 1242 may, for example, be a tunnel implemented according to a network tunneling technology or some other technology over an intermediate network 1240. The intermediate network may, for example, be a shared network or a public network such as the Internet. Alternatively, a private communications channel 1242 may be implemented over a direct, dedicated connection between virtualized private network 1260 and client network 1250.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In some embodiments, either a shared network or a public network may serve as an intermediate network between a provider network and a client network.

To establish a virtualized private network 1260 for a client on provider network 1200, one or more resource instances (e.g., VMs 1224A and 1224B and storage 1218A and 1218B) may be allocated to the virtualized private network 1260. Note that other resource instances (e.g., storage 1218C and VMs 1224C) may remain available on the provider network 1200 for other client usage. A range of public IP addresses may also be allocated to the virtualized private network 1260. In addition, one or more networking devices (routers, switches, etc.) of the provider network 1200 may be allocated to the virtualized private network 1260. A private communications channel 1242 may be established between a private gateway 1262 at virtualized private network 1260 and a gateway 1256 at client network 1250.

In some embodiments, in addition to, or instead of, a private gateway 1262, virtualized private network 1260 may include a public gateway 1264 that enables resources within virtualized private network 1260 to communicate directly with entities (e.g., network entity 1244) via intermediate network 1240, and vice versa, instead of or in addition to via private communications channel 1242.

Virtualized private network 1260 may be, but is not necessarily, subdivided into two or more subnetworks, or subnets, 1270. For example, in implementations that include both a private gateway 1262 and a public gateway 1264, the private network may be subdivided into a subnet 1270A that includes resources (VMs 1224A and storage 1218A, in this example) reachable through private gateway 1262, and a subnet 1270B that includes resources (VMs 1224B and storage 1218B, in this example) reachable through public gateway 1264.

The client may assign particular client public IP addresses to particular resource instances in virtualized private network 1260. A network entity 1244 on intermediate network 1240 may then send traffic to a public IP address published by the client; the traffic is routed, by the provider network 1200, to the associated resource instance. Return traffic from the resource instance is routed, by the provider network 1200, back to the network entity 1244 over intermediate network 1240. Note that routing traffic between a resource instance and a network entity 1244 may require network address translation to translate between the public IP address and the private IP address of the resource instance.

Some embodiments may allow a client to remap public IP addresses in a client's virtualized private network 1260 as illustrated in FIG. 10 to devices on the client's external network 1250. When a packet is received (e.g., from network entity 1244), the network 1200 may determine that the destination IP address indicated by the packet has been remapped to an endpoint on external network 1250 and handle routing of the packet to the respective endpoint, either via private communications channel 1242 or via the intermediate network 1240. Response traffic may be routed from the endpoint to the network entity 1244 through the provider network 1200, or alternatively may be directly routed to the network entity 1244 by the client network 1250. From the perspective of the network entity 1244, it appears as if the network entity 1244 is communicating with the public IP address of the client on the provider network 1200. However, the network entity 1244 has actually communicated with the endpoint on client network 1250.

While FIG. 10 shows network entity 1244 on intermediate network 1240 and external to provider network 1200, a network entity may be an entity on provider network 1200. For example, one of the resource instances provided by provider network 1200 may be a network entity that sends traffic to a public IP address published by the client.

Illustrative System

In some embodiments, a system that implements a portion or all of the methods and apparatus for post data synchronization in migration of domains in network environments as described herein may include a general-purpose computer system that includes or is configured to access one or more computer-accessible media, such as computer system 2000 illustrated in FIG. 11. In the illustrated embodiment, computer system 2000 includes one or more processors 2010 coupled to a system memory 2020 via an input/output (I/O) interface 2030. Computer system 2000 further includes a network interface 2040 coupled to I/O interface 2030.

In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store instructions and data accessible by processor(s) 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for providing client-defined rules for clients' resources in provider network environments, are shown stored within system memory 2020 as code 2025 and data 2026.

In one embodiment, I/O interface 2030 may be configured to coordinate I/O traffic between processor 2010, system memory 2020, and any peripheral devices in the device, including network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices 2060 attached to a network or networks 2050, such as other computer systems or devices as illustrated in FIGS. 1 through 10, for example. In various embodiments, network interface 2040 may support communication via any suitable wired or wireless general data networks, such as types of Ethernet network, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, system memory 2020 may be one embodiment of a computer-accessible medium configured to store program instructions and data as described above for FIGS. 1 through 10 for implementing embodiments of methods and apparatus for post data synchronization in migration of domains in provider network environments. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 2000 via I/O interface 2030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
  a target host device, comprising one or more processors and local persistent storage, configured to implement one or more virtual machines (VMs), wherein the local persistent storage of the target host device is allocated to the one or more VMs, wherein the target host device is part of a provider network that comprises a plurality of host devices, including a source host device, each host device implementing one or more VMs in an execution environment of the respective host device;
  wherein the one or more VMs on the target host device comprises a migrating VM, wherein the migrating VM is being migrated from the source host device; and
  wherein the target host device is configured to:
    obtain a read request directed to the migrating VM on the target host device;
    attempt to retrieve data associated with the read request from the local persistent storage of the target host device;
    determine that at least a portion of the data associated with the read request does not reside in the local persistent storage of the target host device;
    communicate with the source host device to retrieve at least the portion of the data associated with the read request from the local persistent storage of the source host device; and
    respond to the read request using at least the data portion from the local persistent storage of the source host device.

2. The system of claim 1, wherein the target host device is further configured to:
  store at least the portion of the data associated with the read request retrieved from the local persistent storage of the source host device in the local persistent storage of the target host device.

3. The system as recited in claim 1, wherein the target host device comprises a distributed replicated storage module, wherein said attempting, determining, and communicating is performed by the distributed replicated storage module of the target host device, and wherein to communicate with the source host device, the distributed replicated storage module of the target host device is further configured to:
 communicate with a distributed replicated storage module of the source host device.

4. The system as recited in claim 1 wherein, prior to obtaining the read request directed to the migrating VM on the target host device, the target host device is further configured to:
 launch the migrating VM based on a machine image of the VM in the execution environment of the target host device.

5. The system as recited in claim 1 wherein, prior to obtaining the read request directed to the migrating VM on the target host device, the target host device is further configured to:
 establish a communications link over the provider network with the source host device; and
 initiate a synchronization of at least some data from the local persistent storage of the source host device to the local persistent storage of the target host device over the communication link.

6. The system as recited in claim 5, wherein said initiating a synchronization comprises launching a background process to copy the least some data from the local persistent storage of the source host device to the local persistent storage of the target host device over the communications link of the provider network.

7. The system of claim 1, wherein the target host device is further configured to:
 obtain a second read request directed to the migrating VM on the target host device;
 attempt to retrieve data associated with the second read request from the local persistent storage of the target host device;
 determine that the data associated with the second read request resides in the local persistent storage of the target host device; and
 respond to the second read request using at least the data associated with the second read request residing in the local persistent storage of the target host device.

8. The system of claim 1, wherein the target host device is further configured to:
 obtain a write request specifying data to be persisted for the migrating VM;
 store the data specified by the write request to the local persistent storage of the target host device; and
 communicate with the source host device to copy the data specified by the write request to the source host device for storage to the local persistent storage of the source host device.

9. A method, performed by a target host device of a provider network, comprising:
 obtaining, by the target host device of the provider network, a read request directed to a migrating VM on the target host device, wherein the migrating VM on the target host device is being migrated from a source host device of the provider network;
 attempting to retrieve data associated with the read request from a local persistent storage of the target host device;
 determining that at least a portion of the data associated with the read request does not reside in the local persistent storage of the target host device;
 communicating with the source host device to retrieve at least the portion of the data associated with the read request from a local persistent storage of the source host device; and
 responding to the read request using at least the data portion from the local persistent storage of the source host device.

10. The method of claim 9, further comprising:
 storing at least the portion of the data associated with the read request retrieved from the local persistent storage of the source host device in the local persistent storage of the target host device.

11. The method of claim 9, wherein prior to obtaining the read request directed to the migrating VM on the target host device, the method further comprises:
 switching a domain corresponding to the migrating VM from the source host device to the target host device.

12. The method as recited in claim 9 wherein prior to obtaining the read request directed to the migrating VM on the target host device, the method further comprises:
 launching the migrating VM on the target host device based on a machine image of the VM in the execution environment of the target host device.

13. The method as recited in claim 9 wherein prior to obtaining the read request directed to the migrating VM on the target host device, the method further comprises:
 establishing a communications link over the provider network with the source host device; and
 initiating a synchronization of at least some data from the local persistent storage of the source host device to the local persistent storage of the target host device over the communication link.

14. The method as recited in claim 13, wherein said initiating a synchronization further comprises:
 launching a background process to copy the least some data from the local persistent storage of the source host device to the local persistent storage of the target host device over the communications link of the provider network.

15. The method of claim 9, further comprising:
 obtaining a second read request directed to the migrating VM on the target host device;
 attempting to retrieve data associated with the second read request from the local persistent storage of the target host device;
 determining that the data associated with the second read request resides in the local persistent storage of the target host device; and
 responding to the second read request using at least the data associated with the second read request residing in the local persistent storage of the target host device.

16. The method of claim 9, further comprising:
 obtaining a write request specifying data to be persisted for the migrating VM;
 storing the data specified by the write request to the local persistent storage of the target host device; and
 communicating with the source host device to copy the data specified by the write request to the source host device for storage to the local persistent storage of the source host device.

17. One or more non-transitory computer-readable storage media storing program instructions that when executed on or across one or more processors cause the one or more processors to implement a target host device on a provider network to:

obtain a read request directed to a migrating VM on the target host device, wherein the migrating VM on the target host device is being migrated from a source host device of the provider network;

attempt to retrieve data associated with the read request from a local persistent storage of the target host device;

determine that at least a portion of the data associated with the read request does not reside in the local persistent storage of the target host device;

communicate with the source host device to retrieve at least the portion of the data associated with the read request from a local persistent storage of the source host device; and respond to the read request using at least the data portion from the local persistent storage of the source host device.

18. The one or more non-transitory computer-readable storage media of claim 17, wherein the program instructions further cause the one or more processors to:

store at least the portion of the data associated with the read request retrieved from the local persistent storage of the source host device in the local persistent storage of the target host device.

19. The one or more non-transitory computer-readable storage media of claim 17, wherein the program instructions further cause the one or more processors to:

obtain a second read request directed to the migrating VM on the target host device;

attempt to retrieve data associated with the second read request from the local persistent storage of the target host device;

determine that the data associated with the second read request resides in the local persistent storage of the target host device; and respond to the second read request using at least the data associated with the second read request residing in the local persistent storage of the target host device.

20. The one or more non-transitory computer-readable storage media of claim 17, wherein the program instructions further cause the one or more processors to:

obtain a write request specifying data to be persisted for the migrating VM;

store the data specified by the write request to the local persistent storage of the target host device; and communicate with the source host device to copy the data specified by the write request to the source host device for storage to the local persistent storage of the source host device.

\* \* \* \* \*